US006934788B2

(12) United States Patent
Laity et al.

(10) Patent No.: US 6,934,788 B2
(45) Date of Patent: *Aug. 23, 2005

(54) PORT EXPANSION PERIPHERAL MODULE SYSTEM

(75) Inventors: Ian A. Laity, Simi Valley, CA (US); Timothy J. Thornton, Camarillo, CA (US); George Q. Gu, Northridge, CA (US)

(73) Assignee: Intel Corporation, Santa Clara, CA (US)

( * ) Notice: Subject to any disclaimer, the term of this patent is extended or adjusted under 35 U.S.C. 154(b) by 134 days.

This patent is subject to a terminal disclaimer.

(21) Appl. No.: 10/334,282

(22) Filed: Dec. 31, 2002

(65) Prior Publication Data

US 2003/0135681 A1 Jul. 17, 2003

Related U.S. Application Data

(63) Continuation of application No. 09/569,855, filed on May 12, 2000, now Pat. No. 6,697,892.
(60) Provisional application No. 60/142,733, filed on Jul. 8, 1999.

(51) Int. Cl.[7] .............................................. G06F 13/00
(52) U.S. Cl. ........................ 710/303; 710/72; 710/63; 710/64; 710/314; 710/315; 710/317
(58) Field of Search .................................. 710/300–304, 710/62–64, 69–72, 305–307, 313–315; 361/686

(56) References Cited

U.S. PATENT DOCUMENTS

| 4,862,353 A | | 8/1989 | Williams | |
|---|---|---|---|---|
| 5,220,522 A | * | 6/1993 | Wilson et al. | 710/72 |
| 5,410,717 A | * | 4/1995 | Floro | 710/308 |

(Continued)

FOREIGN PATENT DOCUMENTS

| DE | 3612034 A | 10/1987 | ........... G06F/13/38 |
|---|---|---|---|
| JP | 09/059839 | 2/1997 | ............. G06F/1/18 |
| WO | WO 98 25352 | 6/1998 | |

OTHER PUBLICATIONS

PCT International Search Report dated Feb. 11, 2000 regarding International Search Application No. PCT/US 00/18707, international filing date Jul. 7, 2000.

*Primary Examiner*—Paul R. Myers
*Assistant Examiner*—Raymond N Phan
(74) *Attorney, Agent, or Firm*—Blakely, Sokoloff, Taylor & Zafman LLP

(57) ABSTRACT

A user configurable, modular port expansion system allows the user of a host system such as a USB-enabled personal computer to customize a desired configuration of one or more peripheral device modules without the use of cables between modules. The peripheral device modules are physically and electrically connectable to each other side-by-side between a hub end module and a power end module in any sequence so that there can be provided, within the limits of the host port specification, virtually any number of selected, expanded functions in any combination. The peripheral device modules may include, by way of example, a standard parallel DB-25 port module, a two-port serial PS/2 module, a two-port serial DB-9 module, a four- or seven-port USB hub, an RJ-11 Ethernet LAN module, and an RJ-11 modem module. Where the host port is USB compliant, power to the peripheral device modules may be supplied by the host system via a USB standard cable connected to the USB port of the hub end module, or, if more power is required, by an external a.c. power adapter connectable to the power end module. The power end module may also include an USB expansion port.

14 Claims, 21 Drawing Sheets

FIG. 1

U.S. PATENT DOCUMENTS

| | | | |
|---|---|---|---|
| 5,460,547 A | | 10/1995 | Belt et al. |
| 5,568,356 A | | 10/1996 | Schwartz |
| 5,615,404 A | * | 3/1997 | Knoll et al. ................ 710/72 |
| 5,666,495 A | | 9/1997 | Yeh |
| 5,699,226 A | | 12/1997 | Cavello |
| 5,737,189 A | | 4/1998 | Kammersgard et al. |
| 5,774,741 A | | 6/1998 | Choi |
| 5,805,833 A | * | 9/1998 | Verdun ...................... 710/302 |
| 5,826,042 A | | 10/1998 | Kirkendoll |
| 5,828,899 A | * | 10/1998 | Richard et al. ............ 335/828 |
| 5,841,424 A | | 11/1998 | Kikinis |
| 5,974,492 A | | 10/1999 | Gulick |
| 5,991,830 A | * | 11/1999 | Beard et al. ................ 710/18 |
| 6,049,896 A | | 4/2000 | Frank et al. |
| 6,058,441 A | | 5/2000 | Shu |
| 6,105,143 A | | 8/2000 | Kim |
| 6,119,195 A | * | 9/2000 | Ellis et al. ................ 710/306 |
| 6,128,743 A | * | 10/2000 | Rothenbaum ............... 713/300 |
| 6,141,719 A | | 10/2000 | Rafferty et al. |
| 6,216,188 B1 | * | 4/2001 | Endo et al. ................ 710/303 |
| 6,243,780 B1 | | 6/2001 | Jun |
| 6,253,329 B1 | * | 6/2001 | Kang ........................ 713/300 |
| 6,272,644 B1 | * | 8/2001 | Urade et al. ............... 713/320 |
| 6,279,060 B1 | * | 8/2001 | Luke et al. ................. 710/64 |
| 6,286,060 B1 | * | 9/2001 | DiGiorgio et al. ............ 710/31 |
| 6,295,519 B1 | | 9/2001 | Wagner et al. |
| 6,308,239 B1 | * | 10/2001 | Osakada et al. ............ 710/316 |
| 6,321,340 B1 | * | 11/2001 | Shin et al. ................. 713/310 |
| 6,418,499 B1 | * | 7/2002 | Korowitz et al. ........... 710/301 |
| 6,424,524 B2 | | 7/2002 | Bovio et al. |
| 6,493,783 B1 | | 12/2002 | Kinoshita et al. |
| 6,496,892 B1 | * | 12/2002 | Lake et al. ................ 710/301 |
| 6,584,519 B1 | * | 6/2003 | Russell ...................... 710/62 |
| 6,697,892 B1 | * | 2/2004 | Laity et al. ................. 710/72 |

* cited by examiner

| VCCBUS POWER SOURCE DECODE | | | | |
|---|---|---|---|---|
| First End Module | Second End Module | EXT P/W | VCCSEL | VCCBUS |
| IN | OUT | OUT | HIGH | NONE |
| IN | IN | OUT | HIGH | HOSTVCC |
| IN | IN | IN | LOW | EXTVCC |

PORT EXPANSION PERIPHERAL MODULE SYSTEM

CROSS-REFERENCE TO RELATED APPLICATION

This application is a continuation of U.S. patent application Ser. No. 09/569,855, entitled "Computer Port Expansion", filed May 12, 2000, issued as U.S. Pat. No. 6,697,892 on Feb. 24, 2004, which in turn claims the benefit of provisional application Ser. No. 60/142,733 filed Jul. 8, 1999.

BACKGROUND OF THE INVENTION

1. Field of the Invention

The present invention relates generally to a port expansion system for connecting a single port, such as a USB port, on a host system such as a personal computer (PC) to various computer peripheral devices and functions, and particularly to such an expansion system that is user configurable so as to provide a high degree of flexibility and efficiency in the connection of the host system to a wide selection of peripheral devices and functions.

2. Description of the Prior Art

Although the invention and its background will be described chiefly in the context of the USB standard bus interface or protocol, it will be evident to those skilled in the art that the invention may be used with other standard bus interfaces including IEEE 1394, also called "Firewire" or "i.Link", and SCSI.

The difficulty of connecting and properly operating the many different kinds of personal computer peripheral devices and functions such as printers, scanners, digital cameras, modems, disk drives, and so forth, led to the adoption of the Universal Serial Bus (USB) standard which provides a hot pluggable, "plug and play", cascadable serial interface using a low cost standard socket for adding external peripheral devices and functions. The Universal Serial Bus Specification Rev. 1.1 dated Sep. 23, 1998 is incorporated herein by reference in its entirety. Because power as well as data are transmitted through USB cables, some low power devices can be operated without the need for separate power adapters. The USB specification allows up to 127 peripheral devices to be connected to a single PC using USB hubs and defines how these peripheral devices can be connected together so that a host can use the resources provided by each device. USB ports are already found on many new PCs and a wide variety of USB peripherals are already on the market. Legacy-free PCs with one or perhaps two USB ports to connect peripherals are also becoming available. Such PCs do not incorporate traditional, standard interfaces.

There are currently available numerous converters for connecting a USB port on a PC or USB hub to traditional interfaces including serial ports, parallel ports, RJ-45 Ethernet LAN ports, and RJ-11 modem ports. These converters may also include one or more USB ports. However, the converters are housed within individual enclosures requiring a separate cable to attach each enclosure to a host system or to a hub.

Also presently available are multifunction USB hubs. For example, one such multifunction hub expands a USB-enabled PC to provide four additional USB ports along with three traditional ports consisting of two serial ports and one parallel printer port. However, such a multifunction USB hub is integrated into a single housing so that only a fixed number and combination of peripheral device or function ports is made available.

SUMMARY OF THE INVENTION

Broadly, the present invention provides a user configurable, modular port expansion system allowing the user of a host system such as a USB-enabled PC to customize a desired configuration of one or more peripheral device or function modules without the use of cables between modules. The peripheral device modules are physically and electrically connectable to each other side-by-side between first and second end modules in any sequence so that there can be provided, within the limits of the host system port specification, virtually any number of selected, expanded functions in any combination. The peripheral device modules may include, by way of example, a standard parallel DB-25 port module, a two-port serial PS/2 module, a two-port serial DB-9 module, a four- or seven-port USB hub, an RJ-11 Ethernet LAN module, and an RJ-11 modem module.

The invention further provides for the releasable or detachable coupling of the various peripheral device modules. Thus, the user can easily connect and separate the modules manually to readily custom design and assemble any desired combination and number of peripheral device modules within the limits of the host port specification. The mechanical coupling between adjacent modules includes mating connectors which also serve to transmit the required electrical signals between the individual device modules of the port expansion system and between the port expansion system and the host system thereby eliminating the need for external hubs and individual cables to the various modules. A technique for passing signals between the peripheral device modules allow the peripheral device modules to be connected together in any sequence, thus allowing a user to custom-configure a port expansion system to the user's individual requirements. In addition, the system can be disassembled and the peripheral device modules reassembled in a different order if desired. By making available a variety of individual peripheral device modules, a user can purchase and add such modules to an existing system in building block fashion to mix and match peripherals and network connections.

More specifically, in accordance with the invention, there is provided a modular port expansion system for connecting peripheral devices to a host system, the host system including a host port providing a communication link for signals compliant with an industry standard protocol. The port expansion system comprises a hub module including a host port connectable to the host port on the host system; a downstream connector defining a plurality of slave ports, each slave port providing a communication link for signals compliant with the industry standard protocol of the host port on the host system; and a hub module interface circuit interconnecting the host port and the plurality of slave ports. The system further includes a peripheral device module for coupling a peripheral device to the hub module, the peripheral device module being directly connectable to the downstream connector on the hub module. The peripheral device module includes a peripheral device port, connectable to the peripheral device, providing a communication link for signals compliant with an industry standard protocol which may be the same as or different from the protocol of the host port on the host system. The peripheral module further includes an upstream connector releasably mateable with the downstream connector on the hub module, the upstream connector defining a plurality of ports corresponding to the slave ports defined by the downstream connector on the hub module. The upstream connector on the peripheral device module and the downstream connector on the hub module provide a direct, mechanical and electrical interconnection between the hub and peripheral device modules. The peripheral device module incorporates a peripheral device interface circuit connected between one of the ports on the upstream connector and the peripheral device port. Last, the peripheral device module has a downstream connector for mechanically and electrically connecting the peripheral device module directly to a releasably mateable upstream connector on another module.

In accordance with another aspect of the present invention, the plurality of ports defined by the upstream connector on the peripheral device module includes a first port, a second port and successive ports and the downstream connector on the peripheral device module defines a plurality of ports including a first port and successive ports. The first port on the upstream connector is connected to the interface circuitry of the peripheral device module. The second and successive ports defined by the upstream connector on the peripheral device module are sequentially connected to the first and successive ports on the downstream connector of the peripheral device module, along the lines of a "shift one" architecture. In this way, peripheral device modules can be connected together in any sequence.

A port expansion system in accordance with the present invention further includes a power end module connectable to the hub module, or to a peripheral device module, and which forms the end of the port expansion system opposite that of the hub end module. The power end module includes a connector for connection to an external power supply for powering the system in the event the system requires power above a predetermined level. The power end module may also include an expansion port for daisy chaining port expansion systems or for direct connection to one or more peripheral devices.

In accordance with a preferred embodiment, the port expansion system of the present invention utilizes standard, mateable DB-25 connectors for providing electrical and mechanical coupling between adjacent modules. Although the mechanical interconnection between adjacent modules afforded by the mateable DB-25 connectors provides sufficient structural integrity, such mechanical joinder of adjacent modules is preferably supplemented by means for releasably latching the modules together. The combination of the mechanical interconnection provided by the DB-25 connectors and the latching means results in a structure that has the rigidity and sturdiness approaching that of an integral or one piece unit, and creates the appearance of a one piece or solid block construction, yet nevertheless permits easy manual separation of the modules.

BRIEF DESCRIPTION OF THE DRAWINGS

Further benefits, advantages and features will become evident from the detailed description of the preferred embodiments, below, when read in conjunction with the accompanying drawings in which.

DETAILED DESCRIPTION OF THE PREFERRED EMBODIMENTS

The following detailed description is only illustrative of the invention. Various alternatives and modifications can be devised by those skilled in the art without departing from the spirit of the invention. For example, although the invention will be described specifically for use with the USB standard bus interface or protocol, it will be evident to those skilled in the art that the invention has applicability to other standard bus interfaces such as IEEE 1394, also called "Firewire" or "i.Link", and SCSI. Accordingly, the invention is intended to embrace all alternatives, modifications and variations as fall within the scope of the appended claims.

Figure 1:
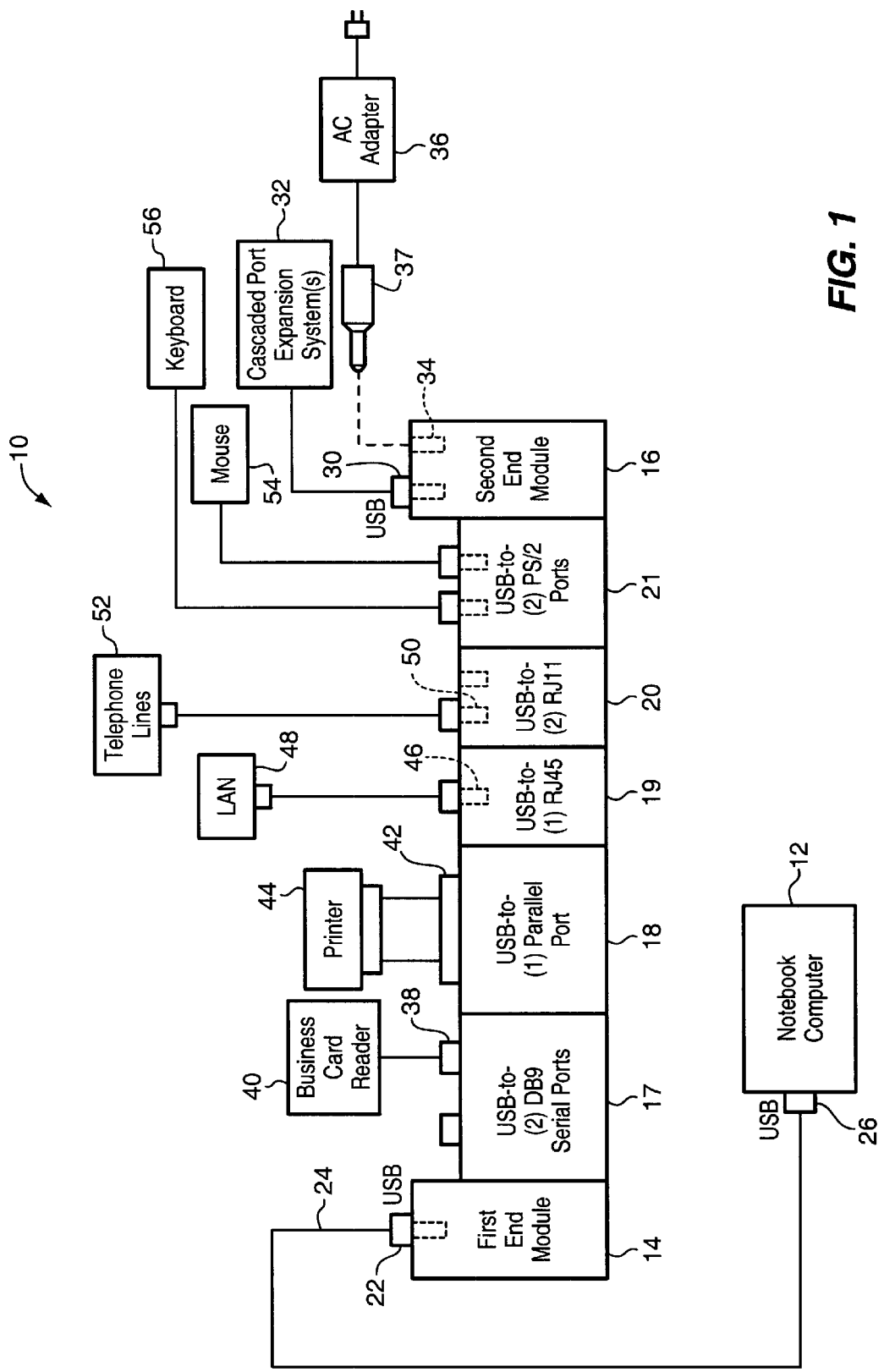
FIG. 1 is a block diagram of a port expansion system in accordance with one specific, exemplary embodiment of the invention.

FIG. 1 shows in block diagram form a port expansion system 10 in accordance with a first specific, exemplary embodiment of the invention, for attaching a variety of computer peripheral devices to a host system 12 which, in the example shown, is in the form of a notebook computer. As used herein, the term "peripheral device" is used in a broad sense, encompassing any physical entity for performing a function so as to provide a capability to the host system. Accordingly, "peripheral devices" may include, by way of example and not limitation, printers, scanners, speakers, digital cameras, Zip® drives, business card readers, keyboards, mice, joysticks, as well as telephone lines, Ethernet local area networks, integrated services digital network (ISDN) and digital subscriber line (DSL). The system 10 comprises a series of physically, that is, electrically and mechanically, interconnected modules including a first or hub end module 14, a second or power end module 16 and five peripheral device modules 17–21 in between the hub and power end modules.

The hub end module 14 includes a USB host port 22 connected by means of a cable 24 to a USB port 26 on the host system 12. The hub end module 14 is the system front-end and interfaces the USB host system 12 with the port expansion system 10 via seven (7) USB slave ports to support up to six (6) peripheral device modules along with the power end module 16. The power end module 16 includes a USB expansion port 30 for connecting the system 10 to one or more additional or cascaded port expansion systems 32. Alternatively, the USB port 30 may be connected to additional USB hubs or USB-enabled peripheral devices or functions (not shown). The power end module 16 further includes a power jack 34 for connecting the system 10 to an external power source such as an a.c. power adapter 36 or equivalent battery pack by means of a plug 37. Such an external power source may be required if a particular configuration of the system 10 requires more power than that available from the power bus on the USB port 22 of the hub module 14.

In the particular example of FIG. 1, the five peripheral device modules 17–21 include the following: a USB-to-dual serial DB-9 port module 17 one of the DB-9 ports 38 of which is shown connected to a business card reader 40; a USB-to-single parallel port (IEEE-1284) module 18 having a parallel output port 42 shown connected to a printer 44; a USB-to-Ethernet module 19 having an RJ-45 port 46 connected to an Ethernet LAN 48; a USB-to-telephone line/phone modem module 20 having two RJ-11 ports, one of which (50) is shown connected to telephone lines 52; and a USB-to-dual serial PS/2 port module 21 shown connected, by way of example, to a mouse 54 and a keyboard 56.

Figure 2:
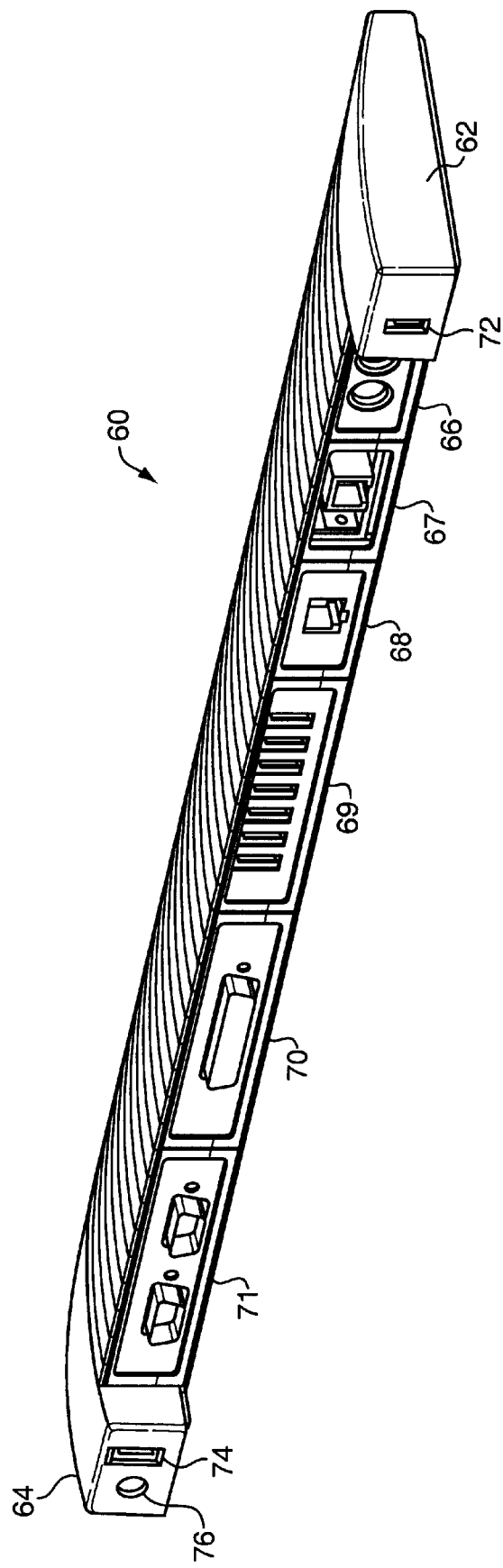
FIG. 2 is a rear perspective view of another embodiment of the port expansion system of the present invention.
Figure 3:
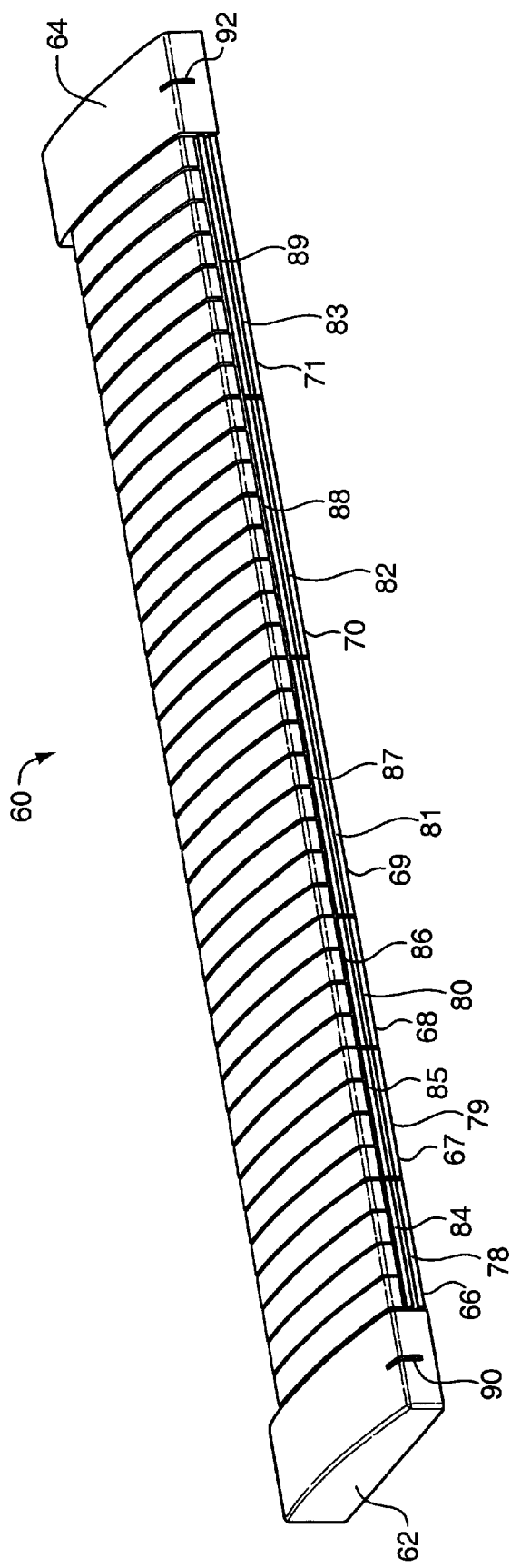
FIG. 3 is a front perspective view of the system shown in FIG. 2.

FIGS. 2 and 3 are rear and front perspective views, respectively, of a practical example of an assembled port expansion system 60 in accordance with the invention. The system of FIGS. 2 and 3 includes a first end or hub module 62, a second end or power end module 64 and six user selected peripheral device modules 66–71 connected between the end modules. The peripheral device modules are connected side-by-side in the following user selected sequence: a dual serial PS/2 port module 66; a modem module 67 having dual RJ-11 jacks; an Ethernet LAN module 68 having a single RJ-45 jack; a 7-port USB expansion hub module 69; a parallel port module 70; and a dual serial DB-9 port module 71. The hub end module 62 includes a USB port 72 for connecting the system 60 to a host system such as a desktop PC or notebook computer. The power end module 64 has a USB expansion port 74 and a jack 76 for connection to an external power supply, as already explained. With reference to FIG. 3, the peripheral device modules 66–71 include front surfaces 78–83 carrying light bars 84–89, respectively, fabricated of a transparent or translucent light conducting plastic. Each of the light bars 84–89 transmits light from one or more light sources, for example, LEDs, within the module to indicate to the user the status and/or activity of that module, as will be further explained below. The hub end module 62 may also include a status/activity indicator comprising a light pipe 90, visible to the user, illuminated by an internal light source responsive to the status and/or activity of the end module 62. The power end module 64 includes a similar status and/or activity indicating light pipe 92.

Figure 4:
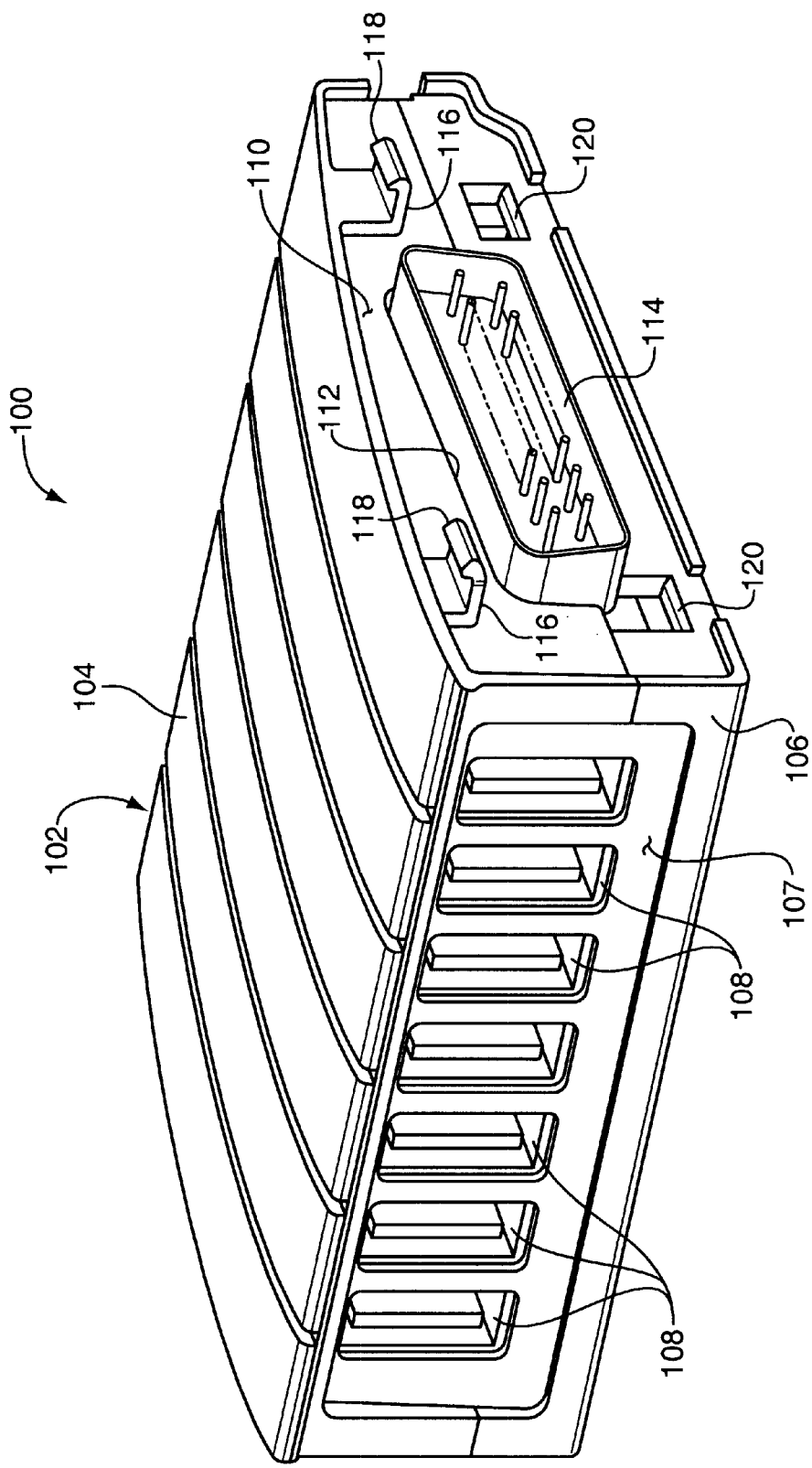
FIG. 4 is a rear/right side perspective view of an example of a peripheral device module in the form of a 7-port USB hub that may form part of a port expansion system in accordance with the present invention.
Figure 5:
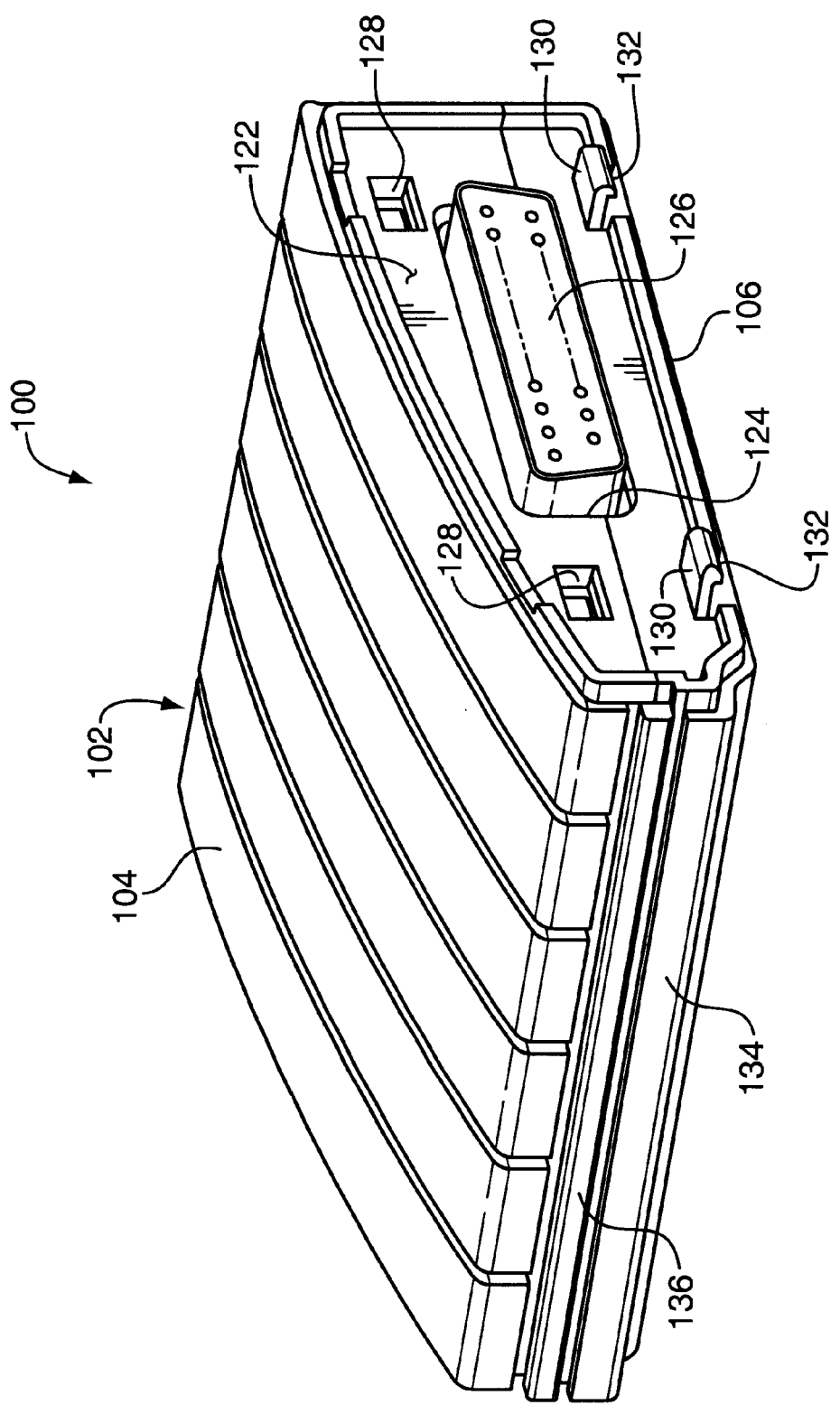
FIG. 5 is a rear/left side perspective view of the module of FIG. 4.

With reference to FIGS. 4 and 5, there is shown certain of the details of an example of a peripheral device module in the form of a 7-port USB hub module 100. The module 100 includes a molded plastic housing 102 comprising an upper housing portion 104 and a lower housing portion 106 joined by screws or other attachment means (not shown). The module 100 includes a rear panel 107 carrying seven USB ports 108 each comprising a USB Type-B connector. The housing 102 further has a right side wall 110 having an elongated opening 112 through which projects an upstream DB-25 male connector or plug 114 for releasable connection to a mating DB-25 female connector or jack carried by an adjacent module, so as to provide a physical, that is, mechanical and electrical, interconnection between the adjacent modules. The module 100 includes intermodule latching means supplementing the mechanical interconnection afforded by the mating DB-25 connectors. Specifically, projecting from the upper portion of the right side wall 110 of the module 100 is a pair of spaced apart, resilient plastic tabs 116 formed integrally with the upper portion 104 of the housing and positioned to enter mating apertures in the left side wall of an adjacent module. Each tab 116 includes at its outer extremity a barb-like enlargement 118.

Formed in the lower portion of the right side wall 110 of the module 100 is a pair of spaced apart apertures 120 adapted to receive a complementary pair of tabs projecting from the lower portion of the left side wall of the housing of an adjacent module. As shown in FIG. 5, the housing 102 of the module 100 includes a left side wall 122 having an elongated opening 124 through which projects a downstream DB-25 female connector or jack 126 for receiving the DB-25 plug on the right side of an adjacent module. Formed in the upper portion of the left side wall 122 of the upper housing portion 104 is a pair of spaced apart apertures 128 for receiving tabs projecting from the right side wall of an adjacent module. Similarly, the lower portion of the left side wall 122 of the module 100 carries projecting tabs 130 each having at its outer extremity a barb-like outer enlargement 132. As used herein, the term "upstream connector" refers to a DB-25 module connector that is electrically closest to the host system 10. Conversely, the term "downstream connector" refers to a DB-25 module connector that is electrically farthest from the host system 10.

The module 100 includes a front wall 134 carrying a longitudinally extending light bar 136 illuminable by an internal light source energizable in response to status and/or activity signals.

Figure 6:
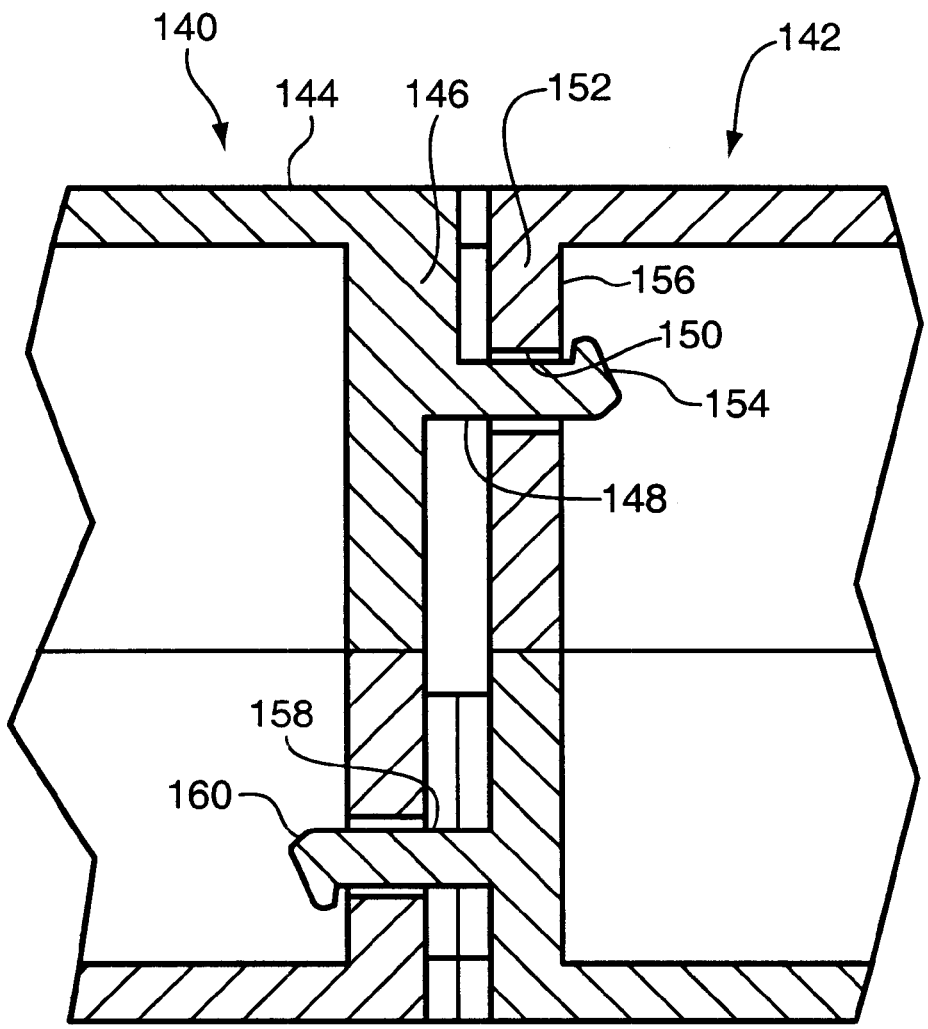
FIG. 6 is a front elevation view, in cross section, showing details of a latch mechanism for coupling adjacent modules of the port expansion system of the present invention.

FIG. 6 is a cross section view showing portions of adjacent modules 140 and 142 to illustrate the manner in which the latching means in the side walls of adjacent modules are coupled to aid in releasably attaching together the modules of a port expansion system in accordance with the invention. The module 140 includes a housing 144 having a right side wall 146 the upper portion of which has outwardly projecting tabs, one of which (148) is shown and which is received by an aperture 150 in the left side wall 152 of the adjoining module 142. A barb-like enlargement 154 on the outer extremity of the tab 148 engages the inner surface 156 of the left side wall 152 of the module 142. A complementary tab 158 on the left side wall 152 of the module 142 is received by an associated aperture 160 in the right side wall 146 of the module 140.

Although use of a latching means such as that described is preferred, such means can be omitted, reliance for the integrity of the mechanical coupling of the modules thus being placed solely on the DB-25 connectors. Still further, it will be evident that the gender of the mating connectors can be reversed and that the connectors are not limited to DB-25 connectors; such connectors, however, are preferred because they are readily available, relatively inexpensive and durable. Last, it will be evident that the references to "left side" and "right side" are for convenience only to facilitate the description of the invention, and are not to be construed in a limiting sense.

Figure 7:
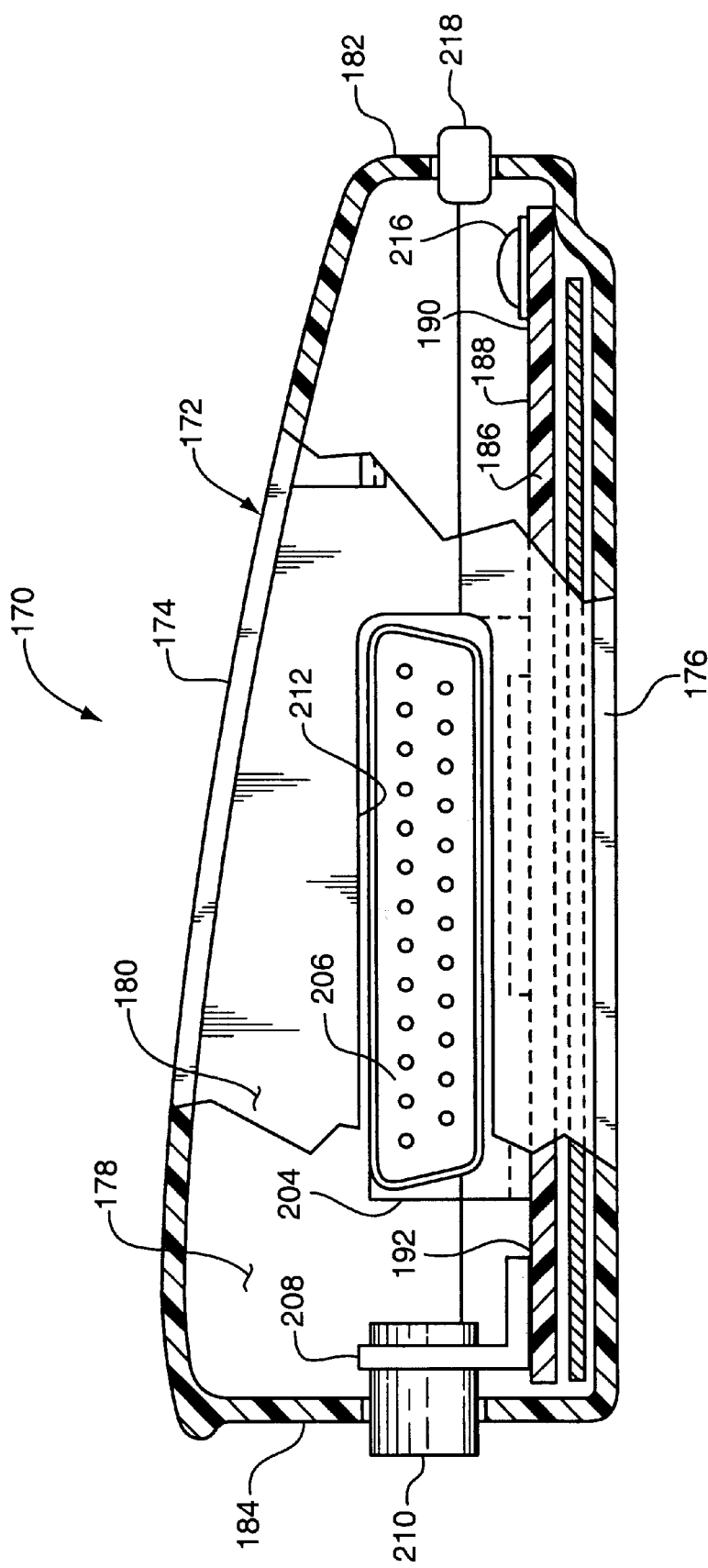
FIG. 7 is a side elevation view, partly cut away and partly in section of another example of a peripheral device module in the form of a USB-to-parallel port module.
Figure 8:
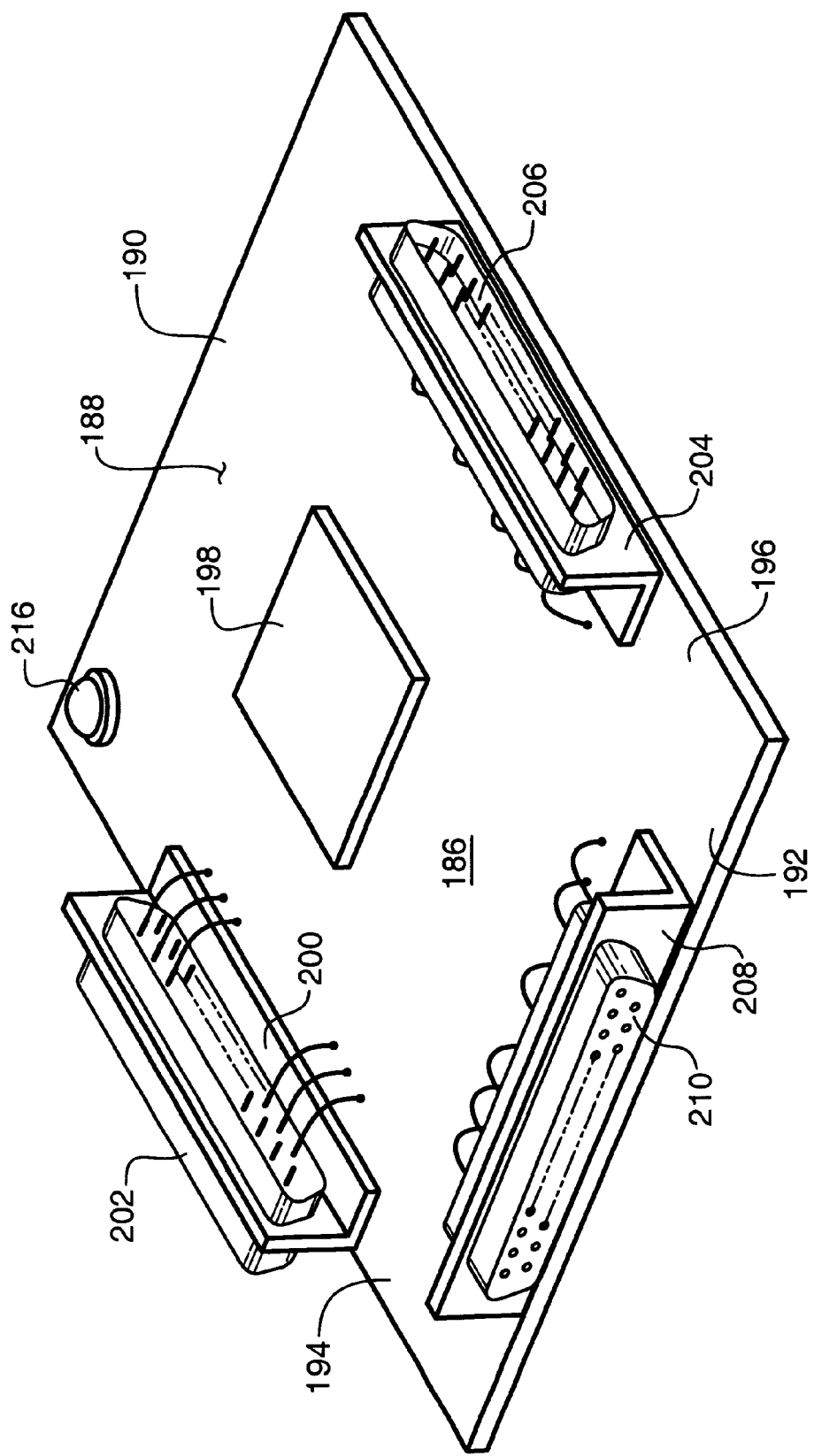
FIG. 8 is a simplified perspective view of a printed circuit board assembly forming part of the peripheral device module of FIG. 7.

FIGS. 7 and 8 depict another example of a peripheral device module in the form of a USB-to-parallel port (IEEE-1284) or Centronics module 170, and show details of the interior thereof. Although a specific module is shown in FIGS. 7 and 8, it will be appreciated that the structure of the interior of the module depicted is generally representative of the various modules that may form a port expansion system in accordance with the invention.

The peripheral device module 170 of FIGS. 7 and 8 includes a molded plastic housing 172 having an upper housing portion 174 and a lower housing portion 176; parallel, left and right side walls 178, 180; and parallel, longitudinally extending front and rear walls 182, 184. Mounted within the lower housing portion 176 is a printed circuit board (PCB) 186 having an upper surface 188; front and rear margins 190, 192; and left and right side margins 194, 196. Mounted on the upper surface 188 of the PCB are electronic circuit components, including interface circuitry, represented by the block 198; a bracket 200 carrying a downstream DB-25 receptacle or jack 202 along the left side margin 194 of the PCB; a second bracket 204 carrying an upstream DB-25 plug 206 along the right side margin 196; and a third bracket 208 carrying a DB-25 jack 210 along the rear margin 192. The left and right side jack and plug connectors 202, 206 are connectable to mating DB-25 connectors on adjacent modules to provide mechanical and electrical interconnections between the modules, as already explained. The rear DB-25 receptacle 210 provides a parallel port conforming to the IEEE-1284 specification connectable by means of a cable to a peripheral device such as a printer, all as well known in the art. The right side or upstream DB-25 plug 206 projects through an elongated opening 212 in the right side wall 180; a similar opening in the left side wall exposes the downstream DB-25 receptacle or jack 202.

Mounted on the PCB 186 along the front margin 190 thereof is a light source 216, such as a light emitting diode (LED), energizable by the circuitry 198 in response to predetermined module status and/or activity conditions. Such status/activity indicators are generally well known in the art. The light source 216 is optically coupled with a light bar 218 of light conducting plastic such as LEXAN (a trademark of General Electric for polycarbonate compositions) carried by the front wall 182 of the module 170. Illumination of the light bar 218 by the light source 216 thus provides a user with an indication of the status and/or activity of the peripheral device module. It will be evident that each peripheral device module may contain more than one status/activity-indicating light source and that such plural light sources may have different colors. Further, instead of a single light bar 218, a plurality of lights bars may be disposed end-to-end along the front wall 182 of the module 170, each associated with a separate light source. Still further, the light bar(s) may be eliminated and the light source(s) may be mounted along the front wall 182 of the module so as to be directly visible to a user. Last, it will be obvious that the light bar(s) or light source(s) may be mounted on portions of the housing other than the rear wall.

Figure 9:
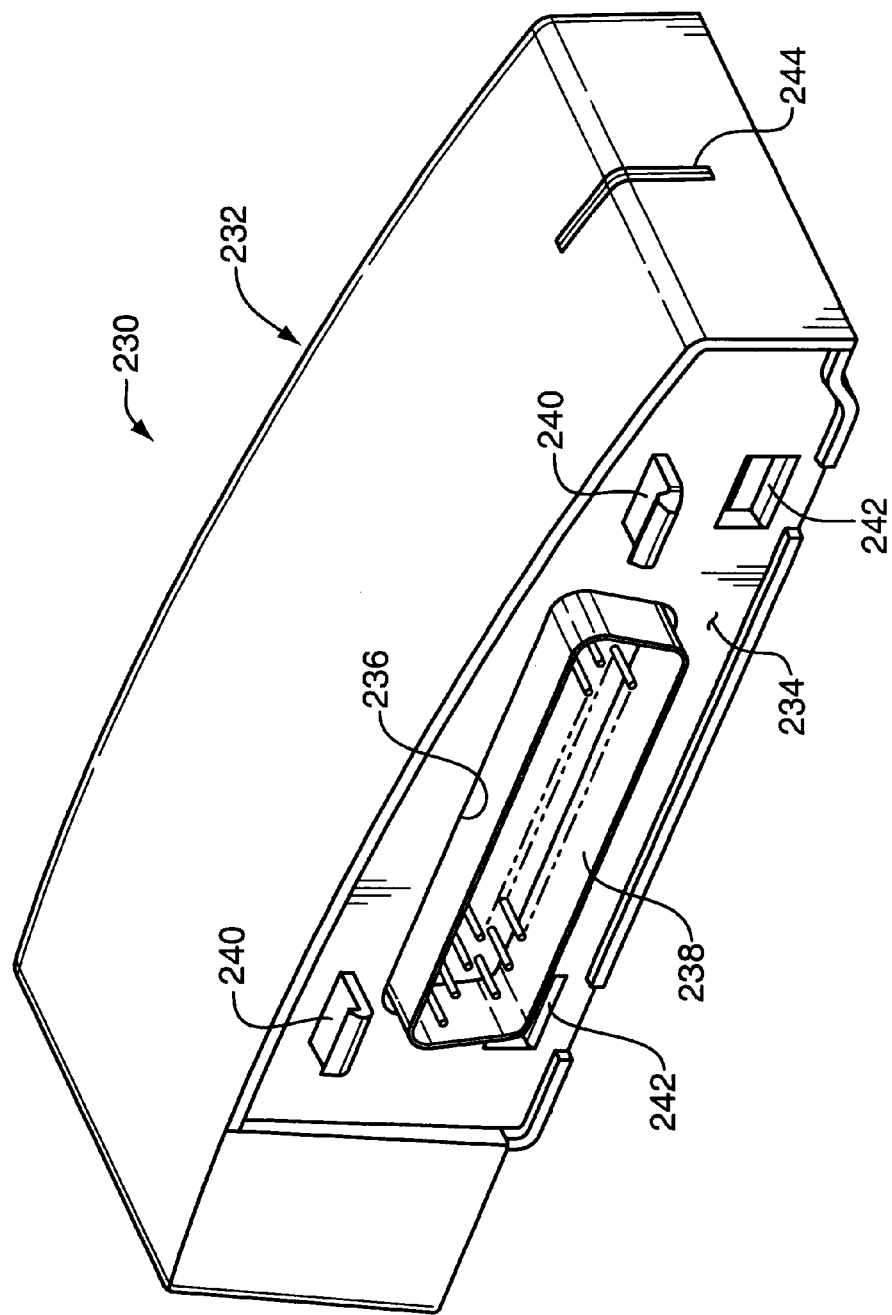
FIG. 9 is a front/right side perspective view of a power end module forming part of the port expansion system of the invention.
Figure 10:
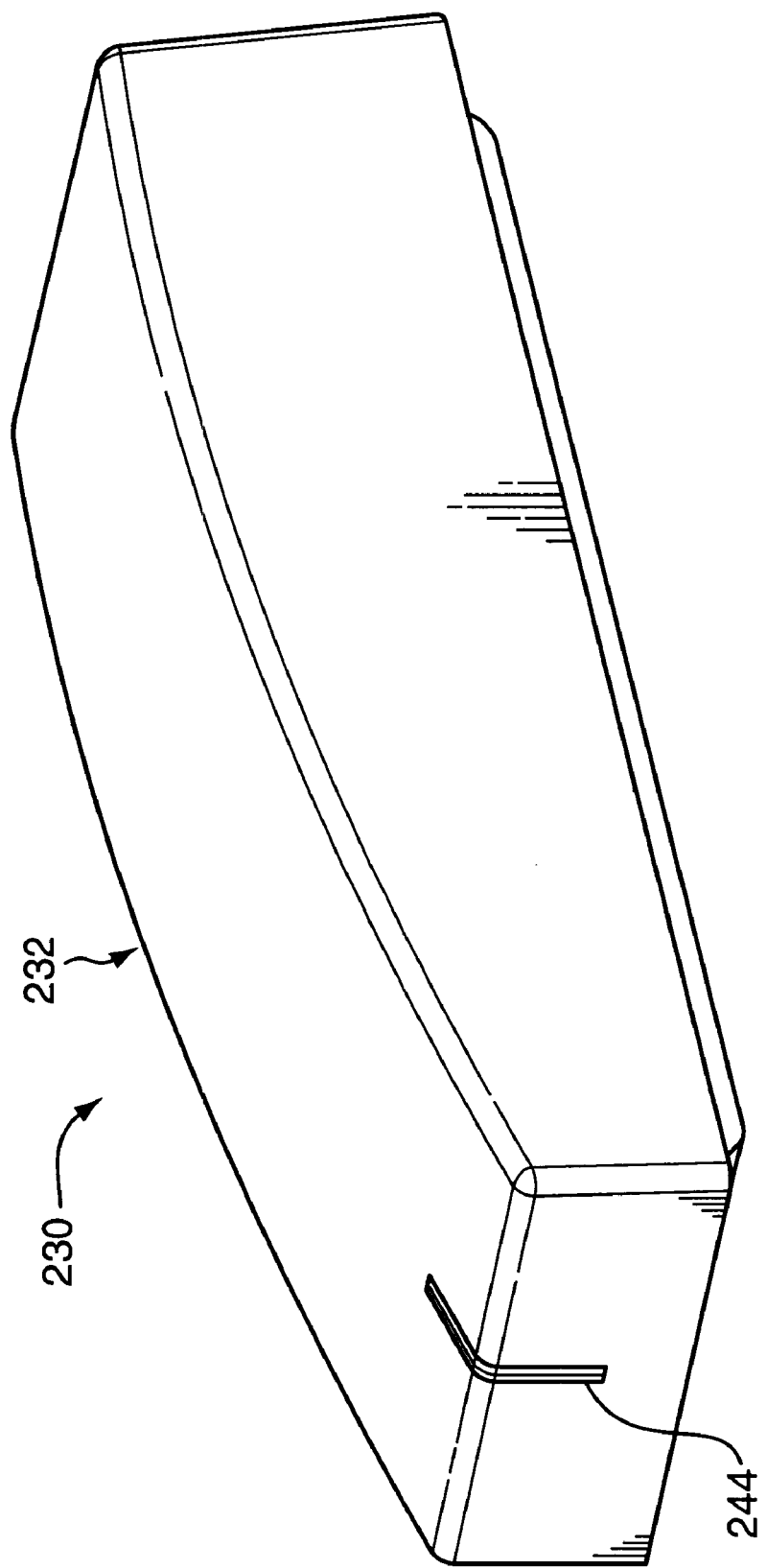
FIG. 10 is a front/left side perspective view of the power end module of FIG. 9.

FIGS. 9 and 10 are perspective views of a typical power end module 230. The hub end module is similarly constructed. The module 230 comprises a molded plastic housing 232 including a right or inner side wall 234 having an elongated opening 236. Projecting through the opening 236 is a DB-25 plug 238 adapted to be connected to a mating DB-25 receptacle or jack on an adjoining module to provide a mechanical and electrical interconnection therewith, as already described. The right side wall 234 of the module 230 further includes latching means in the form of spaced apart tabs 240 and apertures 242, also as already described. Last, the module 230 includes a status/activity indicating light bar having an outer, visible surface 244 exposed adjacent the upper rear corner of the module. The power end module will be further described below in connection with FIG. 14.

Figure 11:
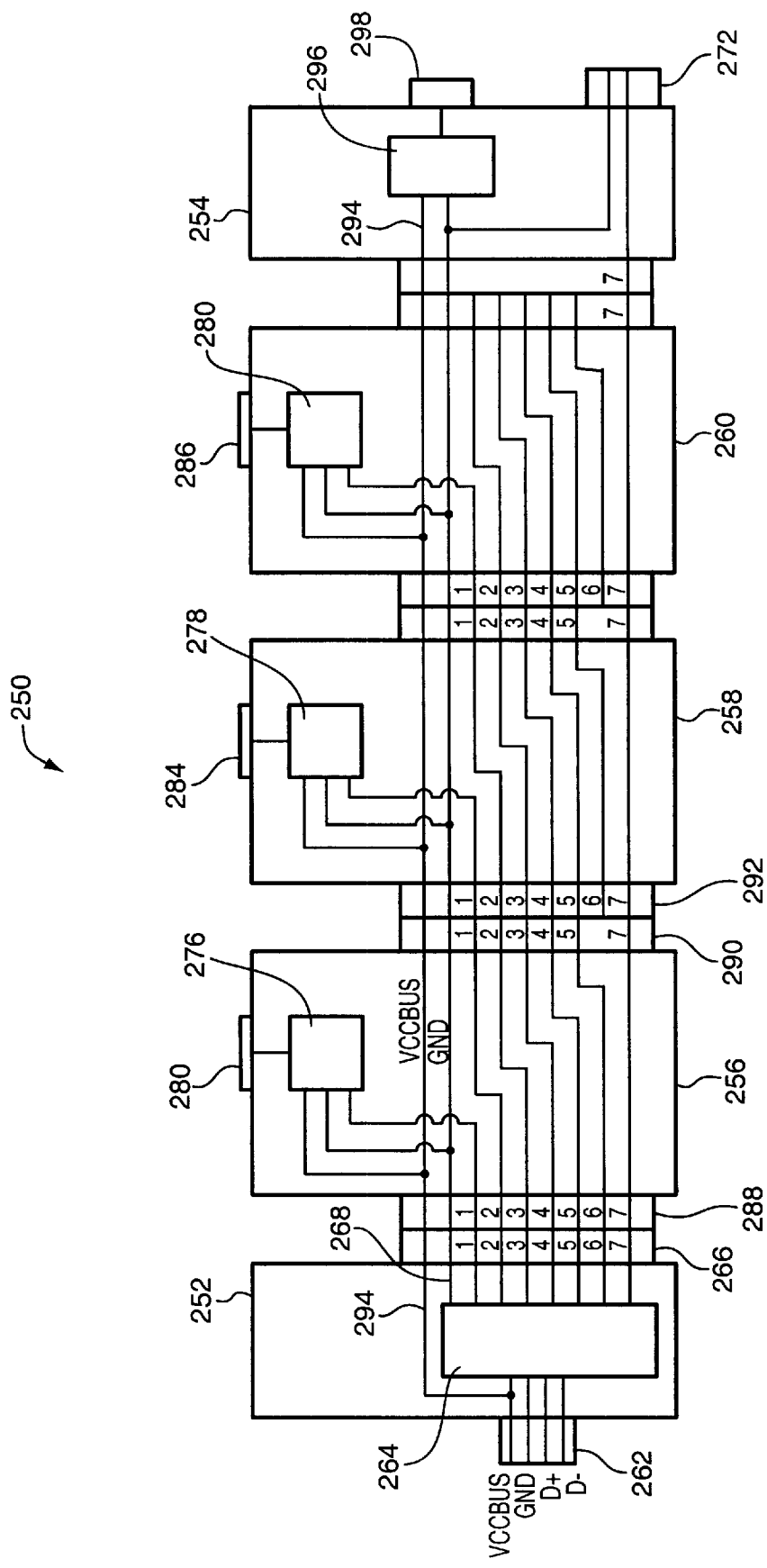
FIG. 11 is a block diagram of a port expansion system in accordance with another specific, exemplary embodiment of the invention showing the electrical interconnections within and between the modules thereof.

FIG. 11 is a block diagram of a port expansion system 250 according to the invention showing in simplified form the signal and power interconnections between the modules. The system 250 includes a hub end module 252 (shown in greater detail in FIG. 12), a power end module 254 (shown in greater detail in FIG. 14) and three peripheral device modules 256, 258 and 260 connected between the hub and power end modules. The peripheral device modules 256, 258 and 260 are shown in generalized form; it will be understood, however, that each of these modules translates USB protocol signals to the protocol of a specific peripheral device connected to the module. The hub end module 252 in FIG. 11 includes a standard USB Type-A connector 262 for connection to a host system and a 7-port hub controller 264 connected to the four terminals of the USB connector 262. On the downstream side, the 7-port hub controller 264 provides USB data (D+ and D−) signals to seven slave ports, numbered as lines 1 through 7, defined by sets of contacts on a downstream DB-25 receptacle or jack 266, as well as ground lines, shown for simplicity as a single ground line (GND) 268. The slave port 7 is a pass-through to a USB expansion port 272 on the power end module 254. As already noted, the USB expansion port 272 on the power end module 254, which is defined by a USB Type-B connector, may be connected to a USB-enabled peripheral device or hub or may be used to further expand the peripheral devices and functions available to the host system by cascading or daisy-chaining additional port expansion systems.

The modules 256, 258 and 260 include interface or protocol conversion circuits 276, 278 and 280, respectively, connected to connectors 282, 284 and 286, respectively, which may be coupled to various peripheral devices such as those shown in FIG. 1. The various modules are physically, that is, electrically and mechanically, connected by means of 25-pin DB-25 jacks and plugs as already explained. Thus, the DB-25 jack 266 on the hub end module 252 is coupled to a DB-25 plug 288 on the peripheral device module 256; the modules 256 and 258 are coupled by a DB-25 jack 290 and plug 292; and so forth, each connector defining identical ports 1–7.

The system 250 includes a power bus line (VCCBUS) 294 which, like the ground line (GND) 268, is common to all of the modules and powers the circuitry within each module.

It will be seen that the same basic wiring is used for the various USB peripheral device modules 256, 258, 260 with USB data line or port number 1 (in practice, comprising two lines D+ and D−) connected to the interface circuits 276, 278 and 280; line or port 2 of the upstream plugs being connected to port 1 of the downstream jacks; port 3 on the upstream plugs being connected to port 2 of the downstream jacks, and so forth. Such a "shift one" architecture permits the user to arrange up to six USB device modules in any sequence between the hub and power end modules. The power end module 254 includes a regulator circuit 296 connected to the power bus 294 and to a power jack 298 which may be coupled to an external power supply, as shown in greater detail in FIG. 14.

Figure 12:
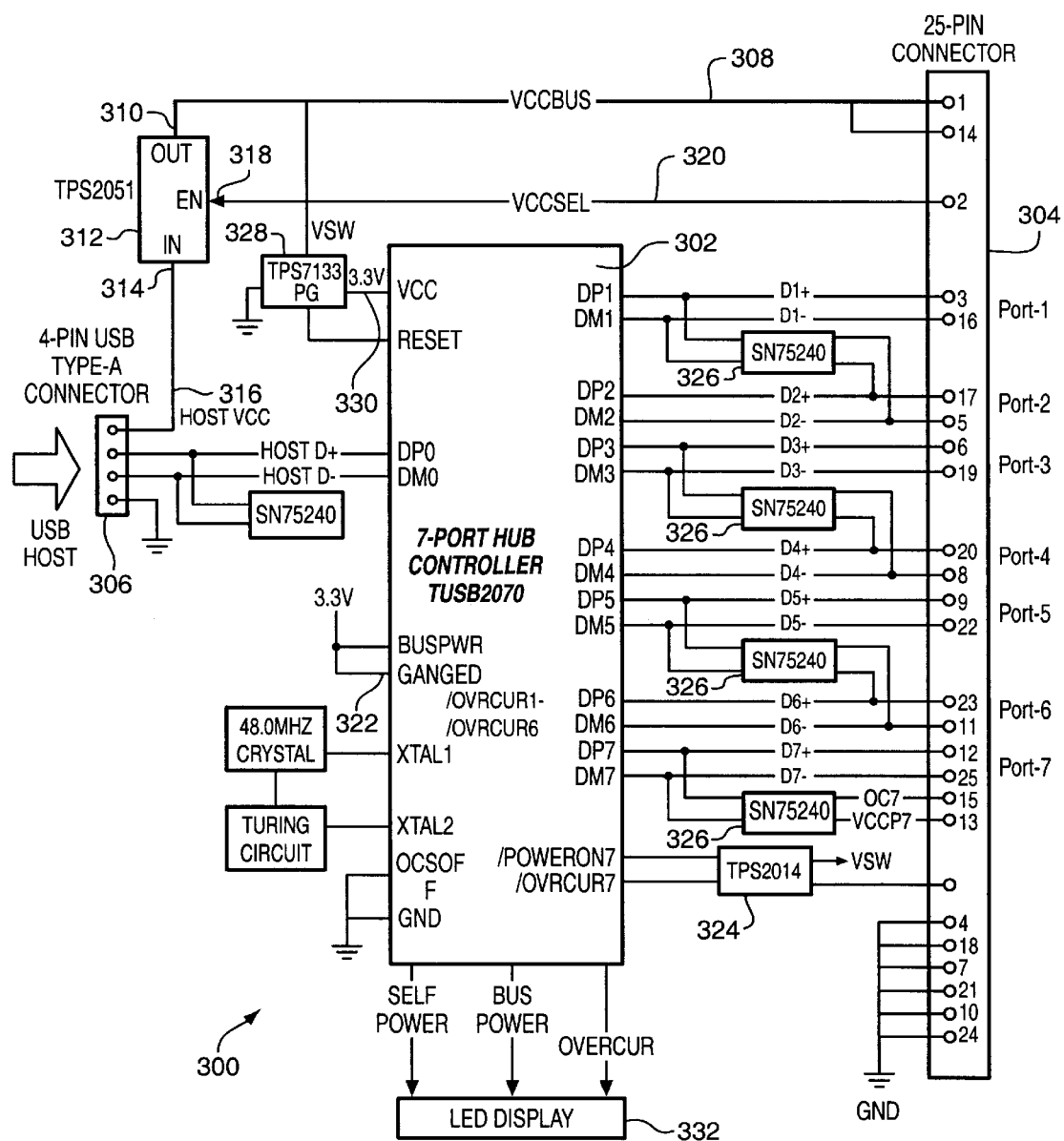
FIG. 12 is a block diagram of an example of a seven (7) port USB hub end module that may be used in a port expansion system in accordance with the present invention.

FIG. 12 is a more detailed block diagram of a practical embodiment of a hub end module 300 that may be used as the "front end" of a port expansion system in accordance with the invention. The module 300, as well as the other modules of the system, utilizes standard, commercially available electrical and electronic components whose specifications and operation are well known in the art and therefore need not be described in detail. The principal component of the hub end module is a 7-port USB hub controller 302 which can support up to seven downstream USB slave ports denoted in FIG. 12 as "Port-1" through "Port-7". These ports are defined by sets of contacts on a downstream DB-25 connector receptacle or jack 304 carried by the module 300. The hub end module 300 further includes host USB port comprising a standard 4-pin USB Type-A connector 306 for connecting the module by means of a standard USB cable to a USB port on a host system such as a notebook computer. As already explained, the DB-25 jack 304 is connectable to a mating upstream DB-25 plug on any peripheral device module, or to a power end module.

The module 300 includes a power bus (VCCBUS) 308 connected to the output terminal 310 of an overcurrent power switching circuit 312. The input 314 of the circuit 312 is connected to the host power bus (HOSTVCC) terminal 316 on the connector 306. The circuit 312 has an enable terminal (EN) 318 to which is connected a control line (VCCSEL) 320. The hub end module 300 operates in either a bus-powered mode or a self-powered, ganged port power management mode depending upon the current drawn by the downstream peripheral device modules, pursuant to the USB Specification, Rev. 1.1, Sections 7.2, et seq.

In the bus-powered mode, the power bus 308 is energized by the HOSTVCC line on the USB port via the overcurrent power switching circuit 312. In the bus-powered mode, the hub end module 300 is capable of supplying to each downstream USB port 100 mA for up to four (4) low-power device class functions. The overcurrent power switching circuit 312 provides a bus power off function when the downstream ports draw a total current exceeding 500 mA from the host system.

As will be further explained in connection with FIG. 14, in the self-powered mode, a +5VDC power supply incorporated in the power end module provides power to the power bus (VCCBUS) 308. In this power mode, the hub end module is capable of supplying to each downstream USB port 500 mA for up to seven (7) low-power or high-power device class functions. The /OVRCUR1−/OVRCUR6 terminals on the controller 302 (shown for simplicity as a single terminal 322) may be tied together for ganged mode operation and be used for overcurrent condition indication and power switch control.

As already explained, the downstream slave "Port-7" is a pass-through USB port connected to the USB expansion connector on the power end module. Power management for "Port-7" is handled separately via a power switching and overcurrent protection circuit 324. When the controller 302 detects a downstream Port-7 fault, power is removed by the switch circuit 324 from Port-7 only, thus allowing the peripheral device modules to continue normal operation.

A transient suppressor 326 is connected across the various pairs of USB port data lines to reduce in-rush current and voltage spikes. Although not shown in all instances, such transient suppressors are connected to the data line pairs of each of the remaining modules.

The hub end module 300 also includes a low-dropout voltage regulator 328 connected between the power bus 308 and the VCC terminal 330 on the controller 302 to provide the required +3.3 VDC VCC to the controller 302.

The hub end module 300 further includes an LED display 332 including a light pipe having an exterior surface visible to the user (FIG. 3) that is illuminated by three LEDs connected to the controller and having different colors indicating the following:

Self-Power On . . . Green
Bus-power On . . . Yellow
Overcurrent . . . Red

Figure 13:
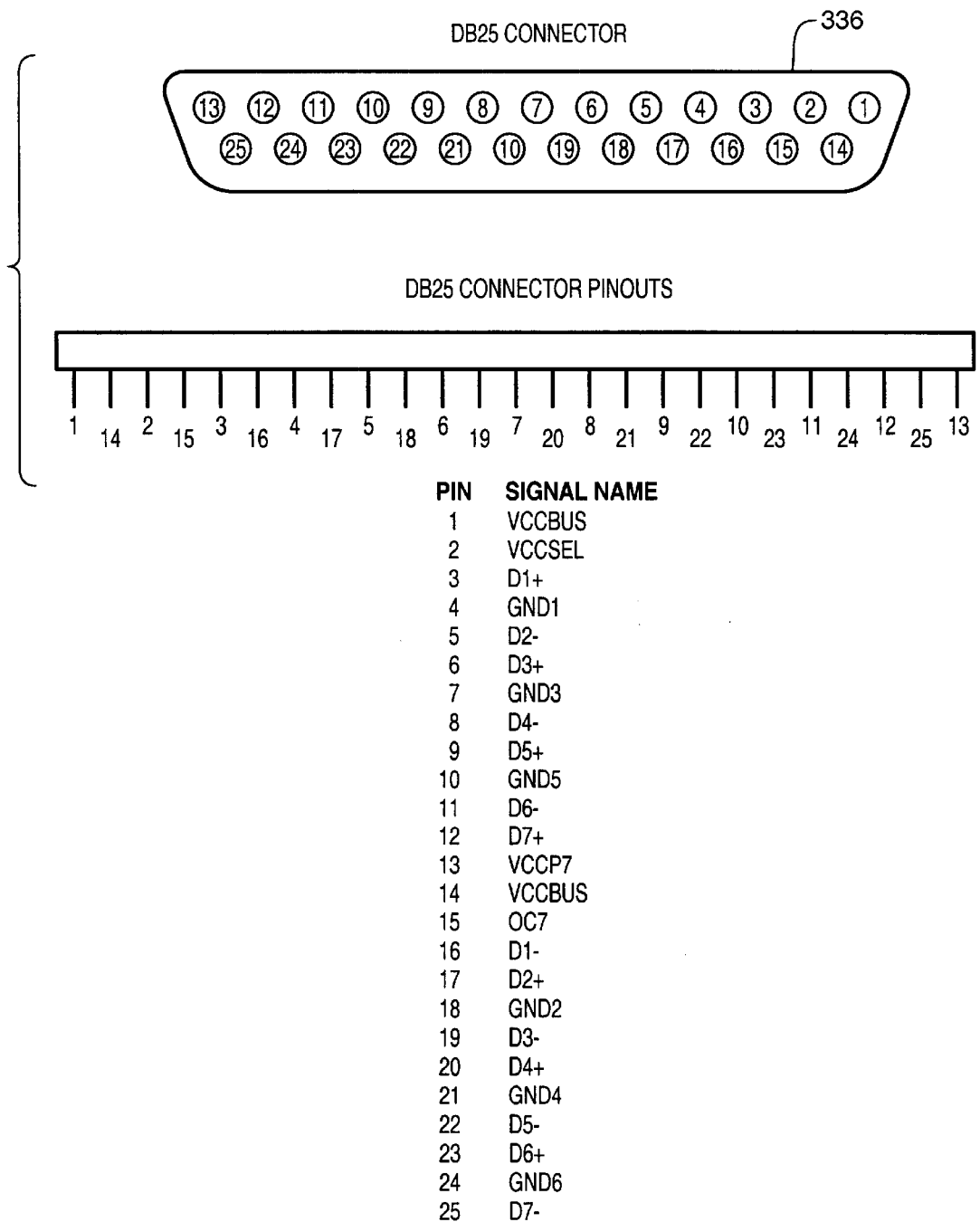
FIG. 13 shows a representation of a DB-25 connector for coupling the adjacent modules of a port expansion system of the invention, along with the connector pinouts and pin assignments thereof.

FIG. 13 shows a representation of a typical DB-25 connector 336 (the representation shown being applicable to a front view of a DB-25 jack and to a rear view of a DB-25 plug), the connector pinouts and the pin assignments. The pin numbers are identified on the block representing the DB-25 jack 304 in FIG. 12.

Figures 14, 14A:
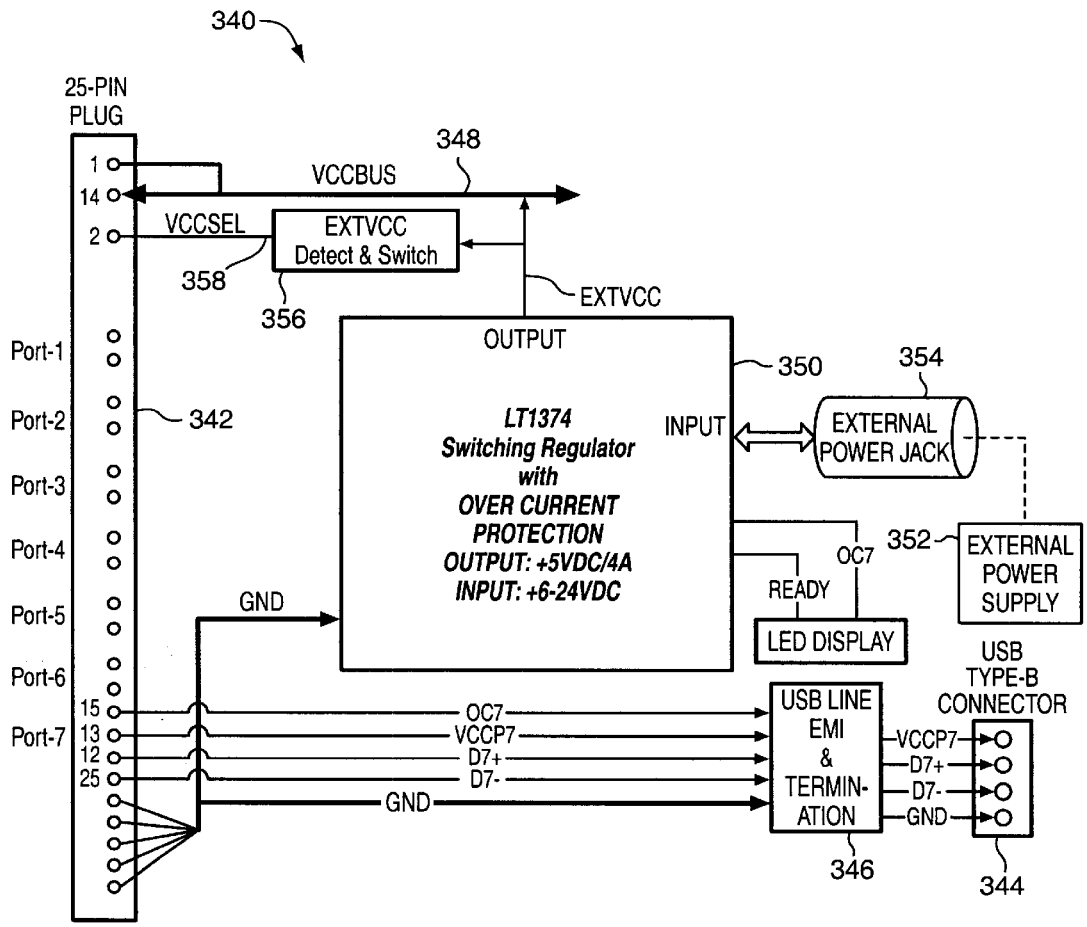
FIG. 14 is a block diagram of an example of a power end module that may be used in a port expansion system in accordance with the present invention.
FIG. 14a is a table showing the sources of system bus power for various conditions.

With reference to now to FIG. 14, there is shown a practical example of a power end module 340 including an upstream DB-25 connector plug 342 mateable with the DB-25 jack of any of the peripheral device modules or of the hub end module, and a USB Type-B expansion connector 344 connected to "Port-7" of the DB-25 plug 342 through termination circuitry 346 providing compliance with FCC, UL and USB requirements. As already noted, the connector 344 permits cascade connection to another port expansion system or to one or more standard USB devices. The module 340 further includes a power bus (VCCBUS) 348 (connectable to the power buses of the other system modules via the intermodule DB-25 connectors) and a voltage regulator 350 for supplying +5VDC (EXTVCC) with overcurrent protection to the power bus 348 in the self-powered mode of operation, from an external power supply 352 via an external power jack 354. A switch circuit 356 detects whether the external power supply 352 is plugged in or not, and provides at an output 358 the control signal VCCSEL which is applied to the enable (EN) terminal 318 of the switch 312 in the hub module 300 (FIG. 12) to switch the VCCBUS power source between HOSTVCC and EXTVCC. It will be seen that the only connections to power end module 340 via the the DB-25 plug 342 comprise power, ground and the "Port-7" pass-through connections to the USB connector 344.

The module 340 also includes an LED display 359 comprising a light pipe (such as the light pipe 92 on the power end module 64 in FIG. 3) illuminable by two LEDs to provide the user with the following indications:

Green . . . USB port 344 ready
Red . . . USB port 344 overcurrent

FIG. 14a is a table showing the source of power on the power bus (VCCBUS) for various operating conditions. Thus, with both the hub and power end modules connected in the system ("in"), but with the external power supply 352 unplugged ("out"), the control signal VCCSEL applied to the enable terminal 318 of the electronic switch 312 in the hub end module 300 will be high thereby applying HOSTVCC to the power bus (bus-powered mode). Conversely, in the self-powered mode, with the power supply 352 plugged into the jack 354, VCCSEL goes low, disconnecting HOSTVCC so that the power bus will be powered by EXTVCC appearing at the output of the voltage regulator 350.

Figure 15:
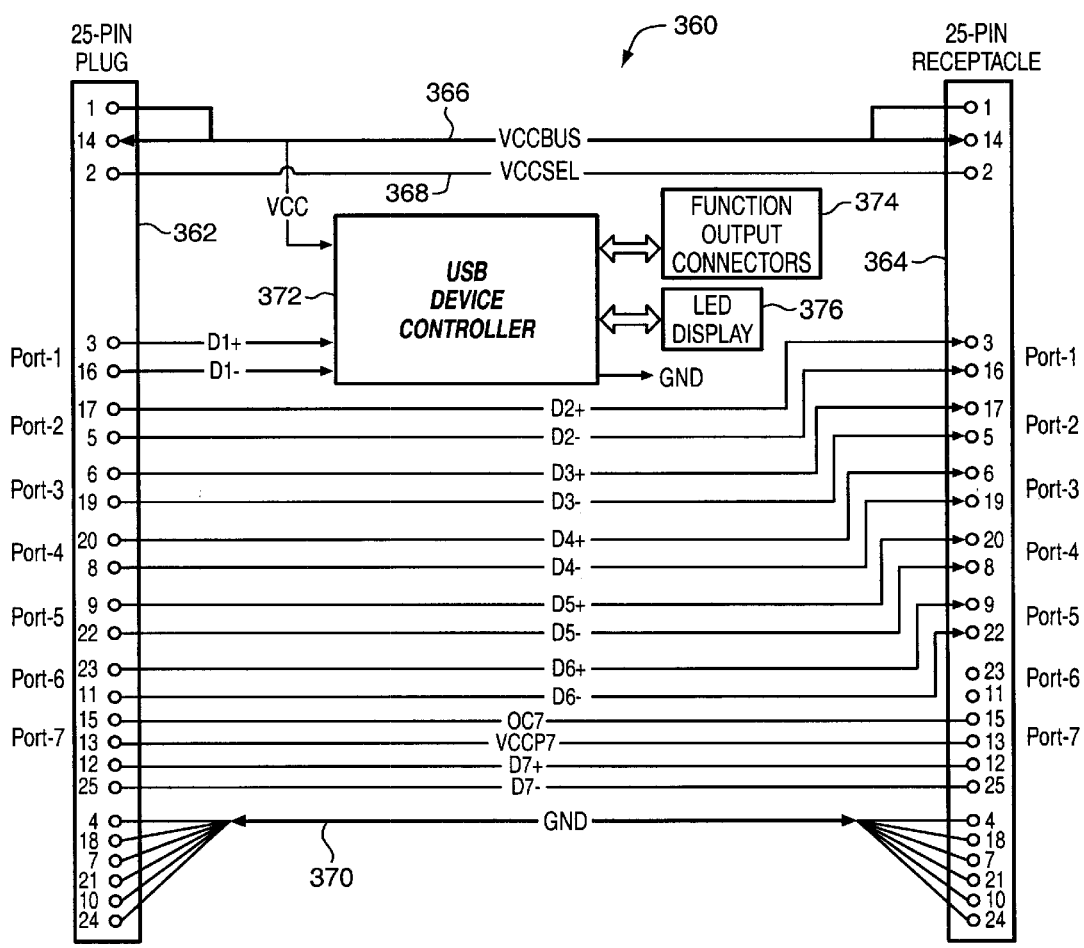
FIG. 15 is a block diagram showing the general form of a typical peripheral device module adapted to be connected between the hub and power end modules of a port expansion system in accordance with the invention.
Figure 16:
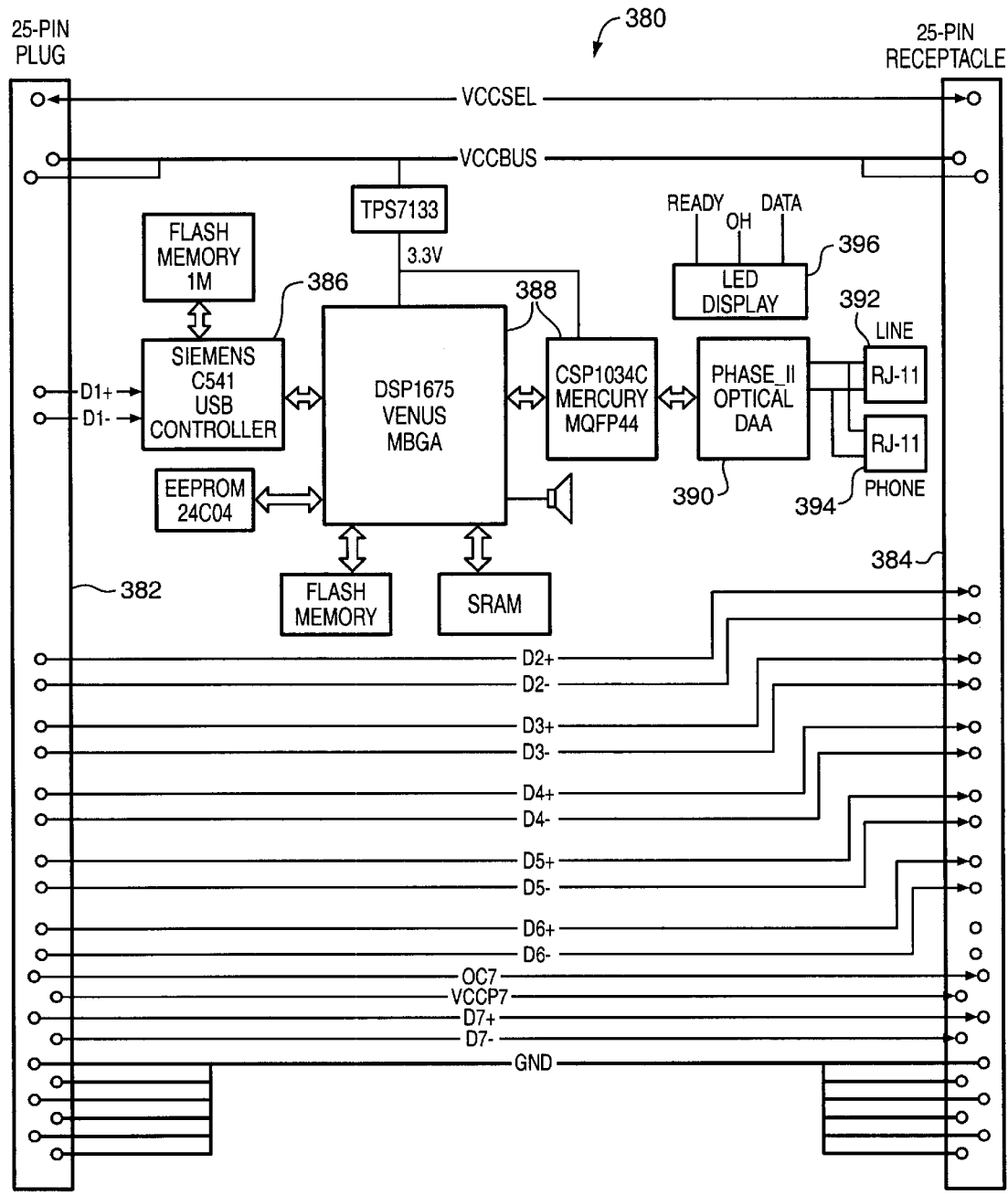
FIG. 16 is a block diagram of a USB-to-global modem peripheral device module.

FIG. 15 is a block diagram depicting the general form of a peripheral device module 360, and includes a DB-25 plug 362 on the upstream side of the module and a DB-25 jack or receptacle 364 on the downstream side. The pin assignments for the connectors 362 and 364 are as shown in FIG. 13. The module 360 includes pass-through power bus (VCCBUS), VCCSEL control signal, and ground lines 366, 368 and 370, respectively. The module 360 includes an interface circuit, for example, a controller 372 providing conversion of the USB data signals appearing on "Port-1" of the DB-25 plug 362 to the protocol of the peripheral device adapted to be connected to the device or function connectors 374 supported by the module. The typical module 360 includes an LED display 376 responsive to status and/or activity signals generated by the interface circuit 372.

In accordance with the "shift one" architecture permitting the peripheral device modules to be connected in any sequence between the end modules, within the peripheral device module 360, "Port-1" (USB data lines D1+ and D1− assigned to pins 3 and 16) on the upstream DB-25 connector or plug 362 is connected to the USB peripheral device interface circuit 372, "Port-2" (USB data lines D2+ and D2− on pins 17 and 5) on the plug 362 is connected to "Port-1" (contacts 3, 16) of the DB-25 jack 364 on the downstream side, "Port-3" (USB data lines D3+ and D3− on pins 6, 19) on the plug 362 is connected to "Port-2" (contacts 17, 5) of the DB-25 jack 364, and so forth. There is no connection internally within the peripheral device module 360 to "Port-6" (contacts 23, 11) on the DB-25 jack 364.

Several specific examples of peripheral device modules will now be briefly described with reference to FIGS. 16 to 21. Again, each of these modules utilizes well known components and therefore need not be described in detail; in each case, the wiring between upstream and downstream DB-25 connectors within the module is as illustrated in FIG. 15, with pin assignments as shown in FIG. 13. With reference to the block diagram of FIG. 16, there is shown a 56K global modem module 380 including an upstream DB-25 connector plug 382 and a downstream DB-25 connector receptacle or jack 384, both with pin assignments as set forth in FIG. 13. The module 380 further comprises a USB controller 386, a modem chipset 388, and a data access arrangement (DAA) 390 in the form of an isolating optocoupler for global-approved modem operation. Connected to the DAA 390 is a pair of RJ-11 jacks 392 and 394 for connection to a telephone line and a phone. The module also includes a status/activity LED display 396.

Figure 17:
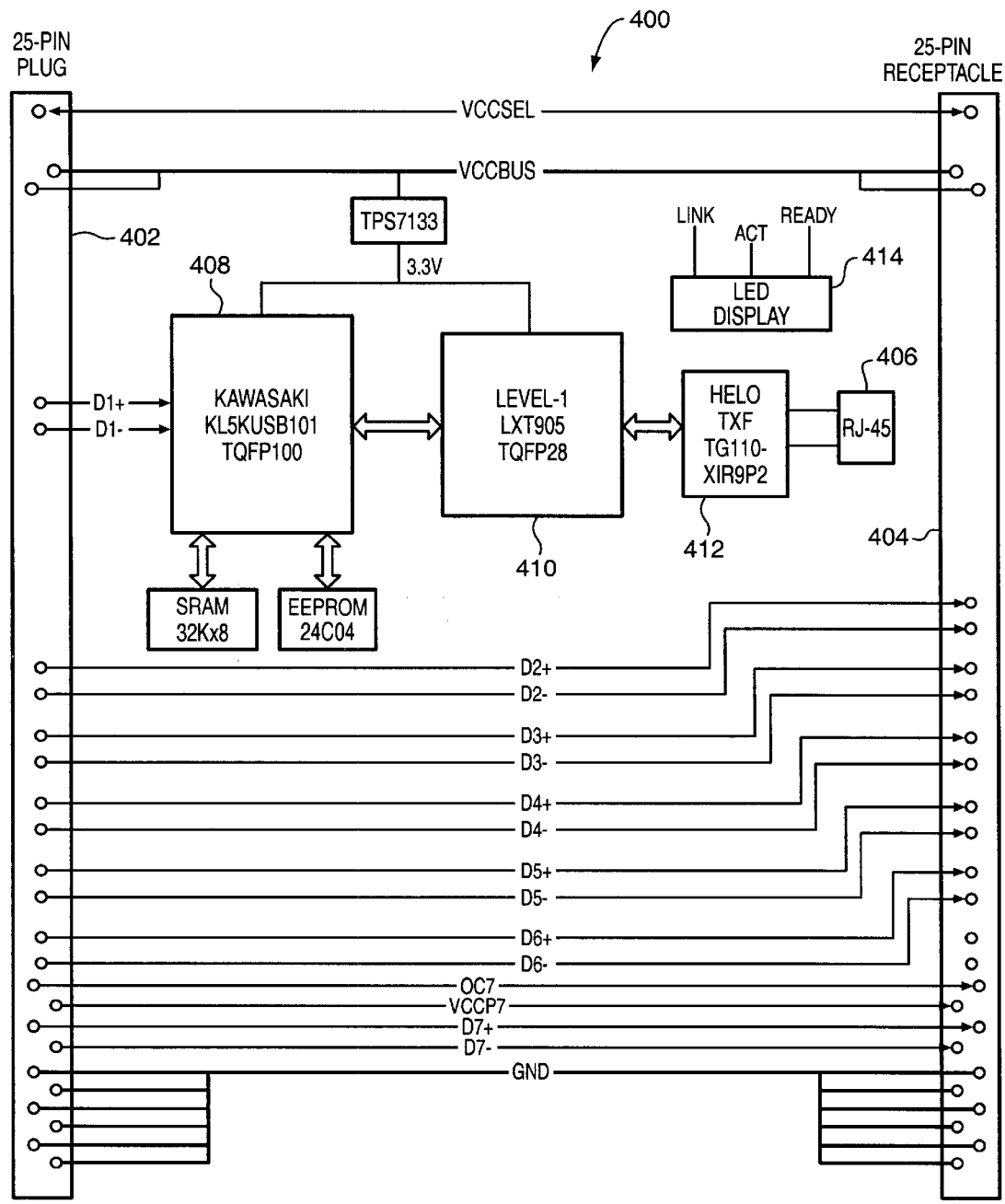
FIG. 17 is a block diagram of a USB-to-Ethernet LAN peripheral device module.

FIG. 17 is a block diagram of a USB-to-10 Mbps Ethernet LAN module 400 including upstream and downstream DB-25 connectors 402 and 404, respectively, and incorporating a single standard modular RJ-45 jack 406 for connecting the module 400 to an Ethernet LAN. The module 400 further includes interface circuitry comprising a USB-to-Ethernet media access controller (MAC) 408, network physical layer devices 410 and 412, and an LED status/activity display 414.

Figure 18:
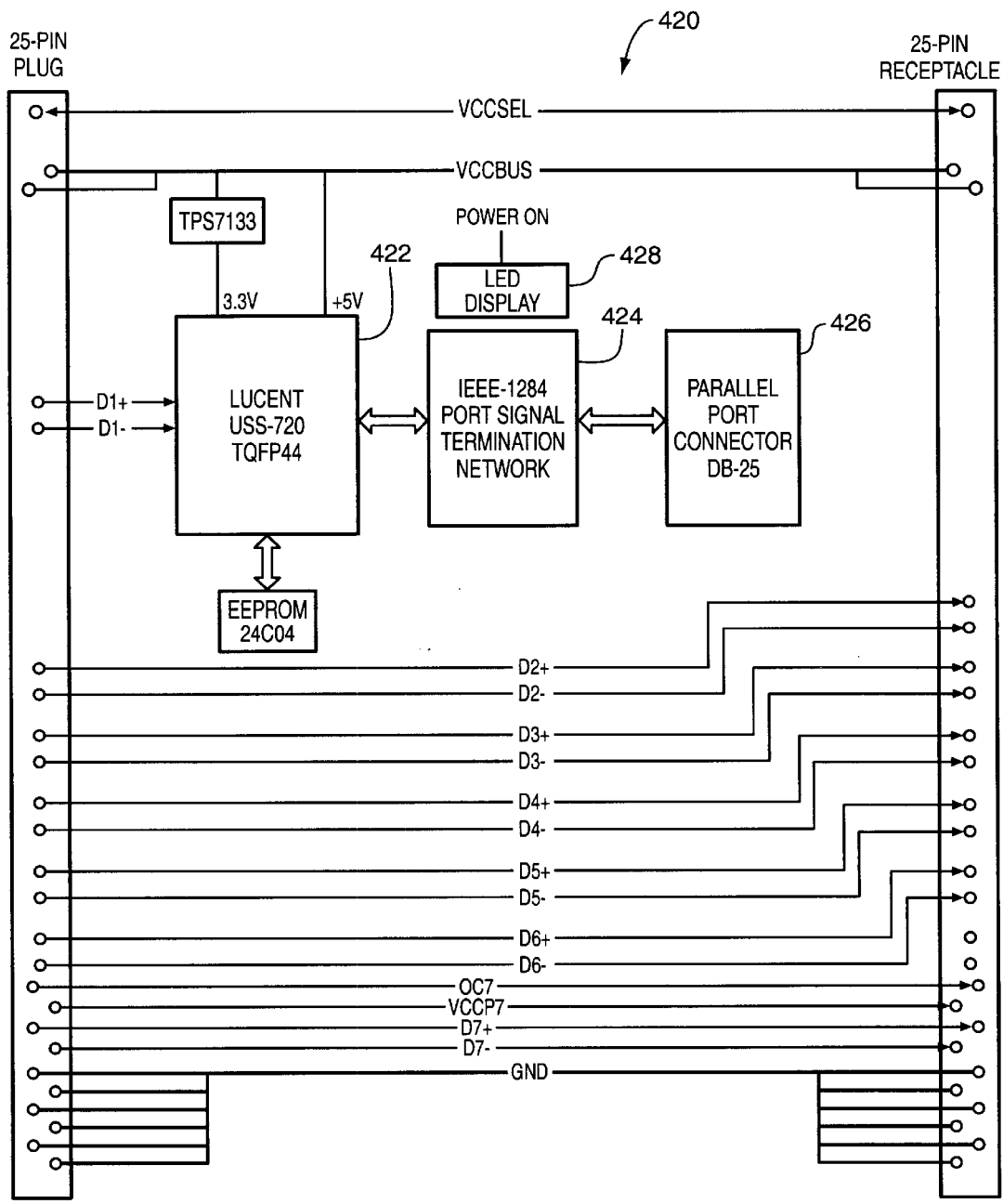
FIG. 18 is a block diagram of a USB-to-parallel port peripheral device module.

With reference to FIG. 18, there is shown a USB-to-single parallel port (IEEE-1284) module 420 including an interface circuit comprising a USB-to-IEEE-1284 bridge device 422.

The bridge device 422 is connected to an IEEE-1284 termination network 424 in turn coupled to a DB-25 parallel port connector 426 adapted to be connected to a peripheral device such as a printer. The module 420 includes an LED display 428 for indicating to the user the power status of the module.

Figure 19:
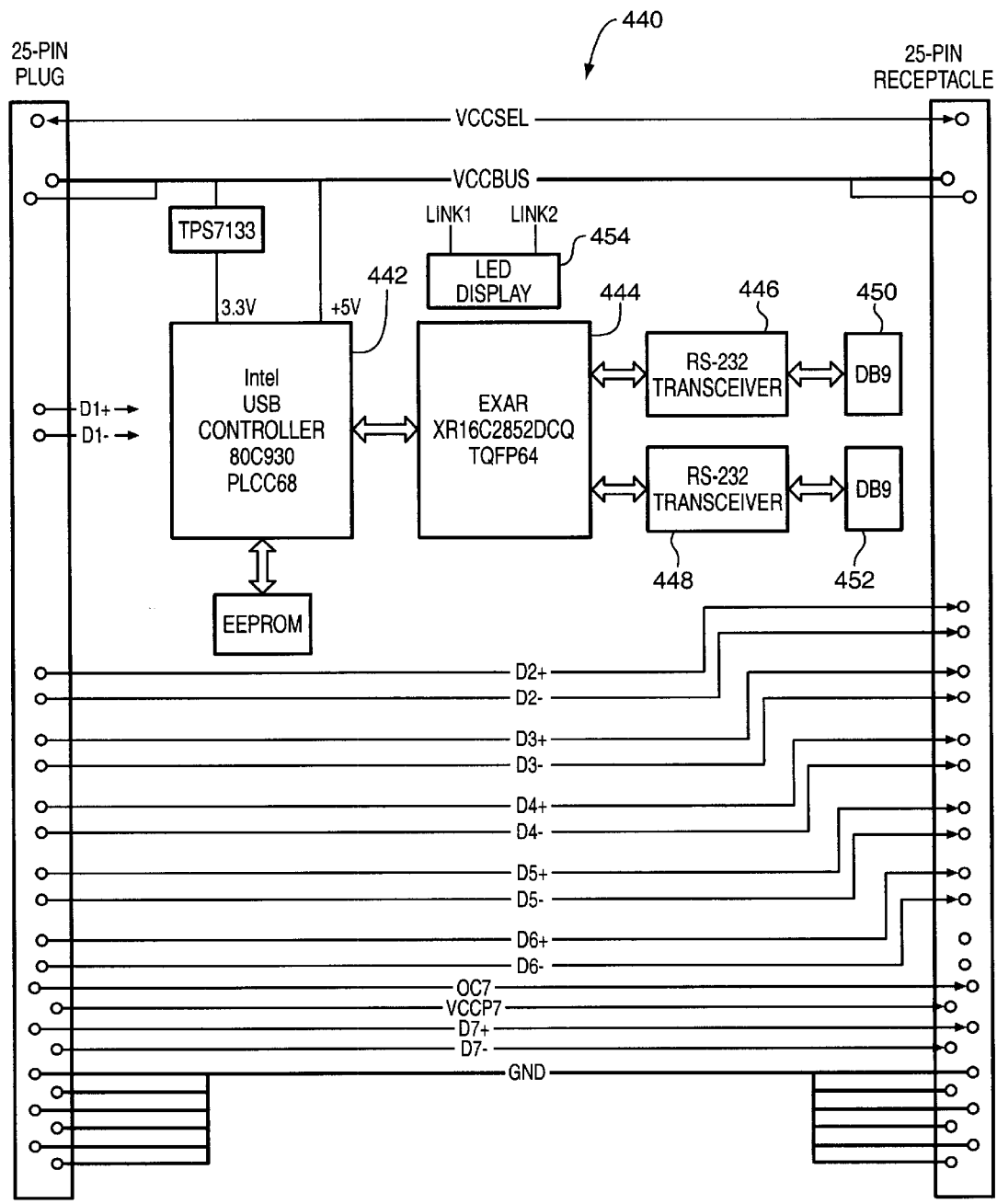
FIG. 19 is a block diagram of a USB-to-dual serial DB-9 port peripheral device module.

With reference to FIG. 19, there is shown a USB-to-dual serial DB-9 port peripheral device module 440 incorporating a USB controller 442, a dual universal asynchronous receiver/transmitter (UART) IC 444 and RS-232 transceivers 446 and 448 coupled to DB-9 connectors 450 and 452, respectively. An LED display 454 indicates the status of the DB-9 ports.

Figure 20:
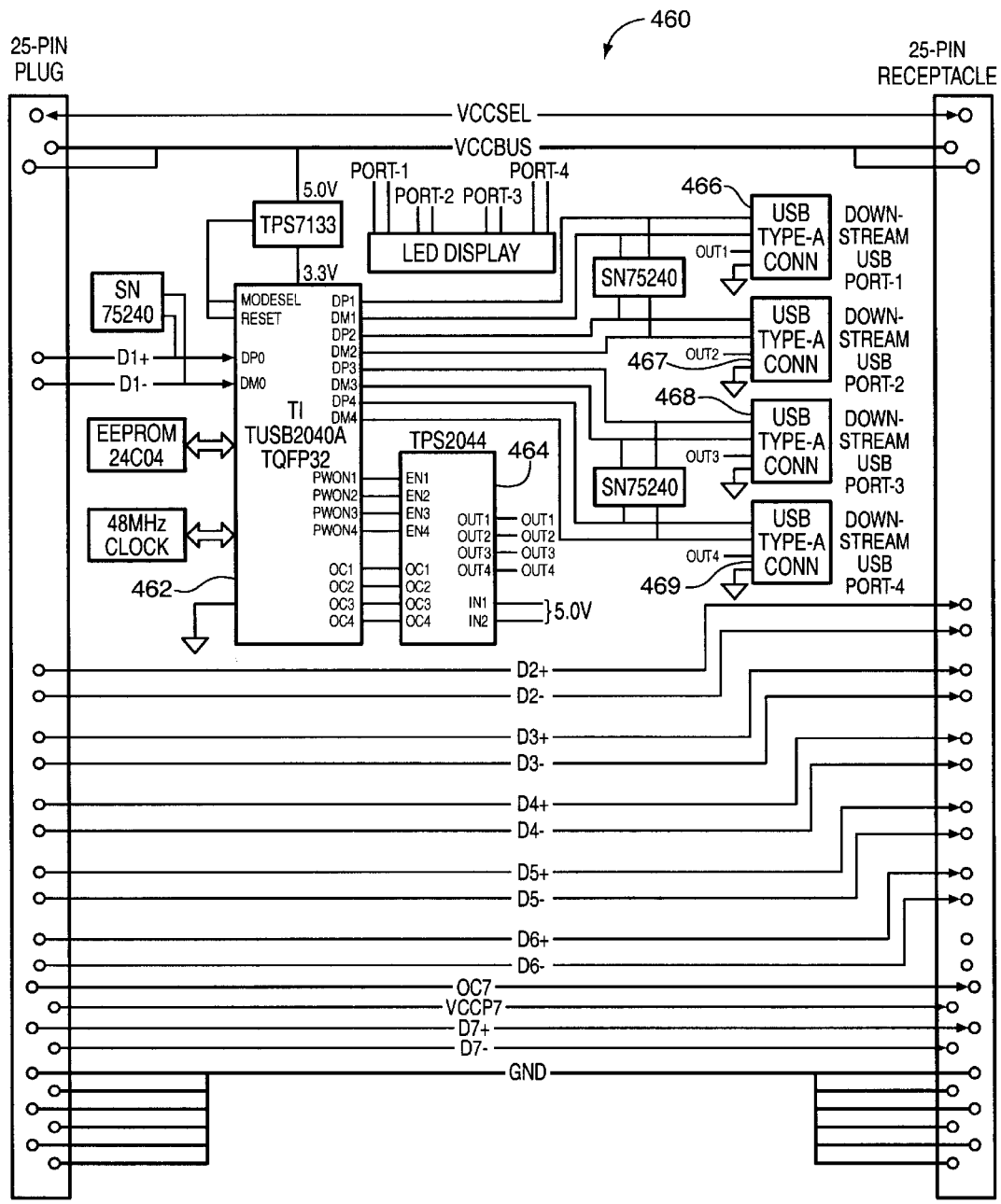
FIG. 20 is a block diagram of a quad port USB hub peripheral device module.

With reference to FIG. 20, there is shown a 4-port USB hub module 460 incorporating a 4-port USB hub controller 462, a quad USB power control switch device 464 and four USB Type A connectors 466–469. The power control switch device 464 is capable of supplying 500 mA to each downstream USB port and can provide current limiting on a per port basis. A 7-port USB hub module is similar to the module 460, except that it includes a 7-port USB hub controller and two quad USB power control switch devices 464.

Figure 21:
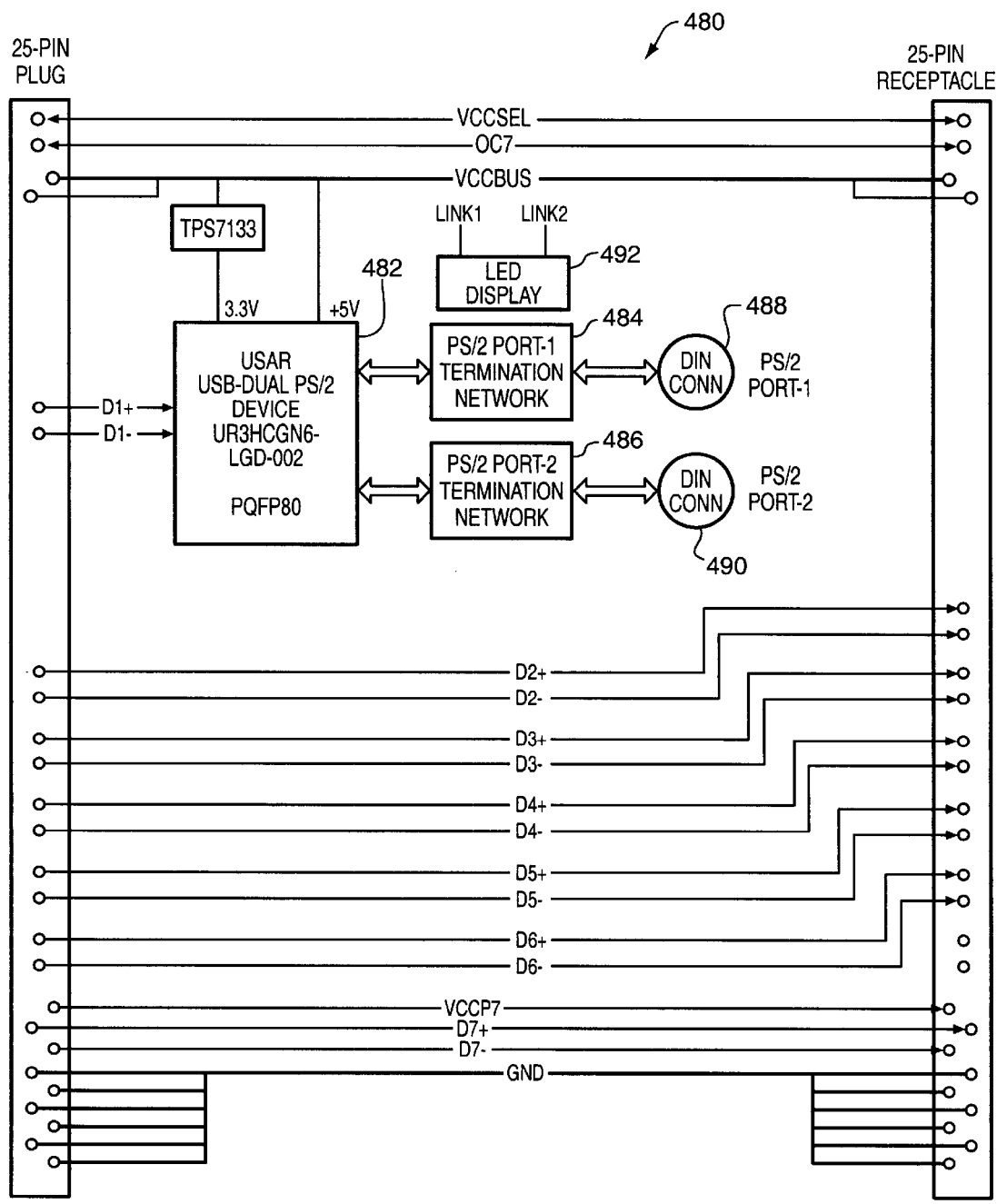
FIG. 21 is a block diagram of a USB-to-dual serial PS/2 port peripheral device module.

With reference to FIG. 21, there is shown a USB-to-dual serial PS/2 port module 480 including an interface circuit in the form of a USB-to-dual serial PS/2 port bridge device 482 and dual PS/2 termination networks 484 and 486 connected to PS/2 port connectors 488 and 490, respectively. Either PS/2 port can accept a mouse or a keyboard. The module 480 also includes a port status-indicating LED display 492.

What is claimed is:

1. A port expansion system comprising:

a hub module comprising a host port and a connector;

a plurality of peripheral modules, each of the plurality of peripheral modules comprising a first connector, a second connector, and a peripheral port, the first connector of each peripheral module being mateable with the connector of the hub module or the second connector of any other peripheral module; and a power module comprising a connector, the second connector of each peripheral module being mateable with the power module connector or the first connector of any other peripheral module.

2. A port expansion system comprising:

a hub module comprising a host port and a connector;

a plurality of peripheral modules, each of the plurality of peripheral modules comprising a first connector, a second connector, and a peripheral port, the first connector of each peripheral module being mateable with the connector of the hub module; and a power module comprising a connector, the connector of the power module being mateable to the second connector of each peripheral module;

wherein the plurality of peripheral modules can be connected in any order between the hub module and the power module.

3. A port expansion system comprising:

a hub module comprising a host port and a connector a plurality of peripheral modules, each of the plurality of peripheral modules comprising a first connector, a second connector, and a peripheral port, the first connector of each peripheral module being mateable with the connector of the hub module; and a power module comprising a connector, the connector of the power module being mateable to the second connector of each peripheral module;

wherein any of the plurality of peripheral modules can be removed from the system.

4. A port expansion system comprising:

a hub module comprising a host port and a connector;

a plurality of peripheral modules, including a first peripheral module, each of the plurality of peripheral modules comprising a first connector, a second connector, and a peripheral port, the first connector of each peripheral module being mateable with the connector of the hub module; and a power module comprising a connector, the connector of the power module being mateable to the second connector of each peripheral module;

wherein signals between the host port and the port of the first peripheral module are transmitted through any intervening peripheral modules between the hub module and the first peripheral module.

5. A port expansion system comprising:

a hub module comprising a host port and a connector;

a plurality of peripheral modules, including a first peripheral module and a second peripheral module, each of the plurality of peripheral modules comprising a first connector, a second connector, a peripheral port, and a protocol conversion circuit, the first connector of each peripheral module being mateable with the connector of the hub module, the protocol conversion circuit of each peripheral module converting signals between a communication protocol for the host port to a communication protocol for the peripheral port; and a power module comprising a connector, the connector of the power module being mateable to the second connector of each peripheral module.

6. The system of claim 5, wherein the protocol conversion circuit for the first peripheral module utilizes a different protocol than the protocol conversion circuit for the second peripheral module.

7. The system of claim 6, wherein the host port utilizes an industry standard communication protocol.

8. The system of claim 7, wherein the hub port is a USB port.

9. A port expansion system comprising:

a hub module comprising a host port and a connector;

a plurality of peripheral modules, each peripheral module comprising a first connector, a second connector, and a peripheral port, the first connector of each peripheral module being mateable with the connector of the hub module;

a power module comprising a connector, the connector of the power bus module being mateable to the second connector of each peripheral module; and a power bus, the power bus having a first end in the power module and a second end in the hub module, the power bus being connectable between the connector of the hub module and the first connector of a first peripheral module, and the power bus being connectable between the connector of the power module and the second connector of a second peripheral module.

10. The system of claim 9, wherein the hub module can operate in a plurality of power modes, the power modes including a first power mode and a second power mode, the power bus being energized by power received from the host port in the first power mode, the power bus being energized by power received from a power supply contained in the power module in the second power mode.

11. The system of claim 10, wherein the system detects whether the power module is connected to an external power source, the system switching to the second power mode if a connection to the external power source is detected.

12. A port expansion system comprising:

a hub module comprising a host port and a connector;

a first peripheral module comprising a first connector, a second connector, and a peripheral port, the first connector of the first peripheral module being mateable with the connector of the hub module; and a power module comprising a connector and a port, the connector of the power module being mateable to the second connector of the first peripheral module, the port of the power module being compatible with the host port.

13. The system of claim 12, wherein the port of the power module is connectable to another port expansion system.

14. The system of claim 13, wherein the port of the power module is connectable to one or more peripheral devices.

* * * * *